United States Patent
Wamble, III et al.

(10) Patent No.: US 9,509,244 B2
(45) Date of Patent: *Nov. 29, 2016

(54) FLUID TURBINE MODULAR ELECTRIC GENERATOR INCLUDING REMOVABLE STATOR MODULES WITH INTEGRATED POWER ELECTRONICS AND MAGNETIC BEARING SYSTEM

(71) Applicant: UNIMODAL SYSTEMS LLC, Shoreline, WA (US)

(72) Inventors: John Lee Wamble, III, Bothell, WA (US); Christopher Perkins, Westlake Village, CA (US); John Cole, Dana Point, CA (US); Clark Foster, Mission Viejo, CA (US); Robert Baertsch, Menlo Park, CA (US)

(73) Assignee: UNIMODAL SYSTEMS, LLC, Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,083

(22) Filed: Aug. 11, 2014

(65) Prior Publication Data

US 2015/0028590 A1    Jan. 29, 2015

Related U.S. Application Data

(63) Continuation of application No. 13/040,195, filed on Mar. 3, 2011, now Pat. No. 8,803,354, which is a continuation-in-part of application No. 11/960,605, filed on Dec. 19, 2007, now Pat. No. 8,171,858.

(Continued)

(51) Int. Cl.
*H02P 9/04* (2006.01)
*H02P 9/48* (2006.01)
(Continued)

(52) U.S. Cl.
CPC ................. *H02P 9/48* (2013.01); *B60L 13/04* (2013.01); *F03D 9/002* (2013.01); *H02K 7/09* (2013.01);
(Continued)

(58) Field of Classification Search
CPC .... B60L 13/04; B60L 2220/58; F03D 9/002; F05B 2210/16; H02K 16/00; H02K 2201/15; H02K 2213/12; H02K 7/09; H02K 7/1823; H02P 25/22; H02P 9/008; H02P 9/48; Y02E 10/725; Y02T 10/641

See application file for complete search history.

(56) References Cited

U.S. PATENT DOCUMENTS 4,061,089 A    12/1977   Sawyer
4,720,640 A    1/1988    Anderson et al.
(Continued)

OTHER PUBLICATIONS

International Search Report and Written Opinion dated May 6, 2011 for International Application No. PCT/US11/27086 filed on Mar. 3, 2011, 13 pages.

(Continued)

*Primary Examiner* — Tulsidas C Patel
*Assistant Examiner* — S. Mikailoff
(74) *Attorney, Agent, or Firm* — Polsinelli PC

(57) ABSTRACT

An electric power generation system may be constructed of multiple similar generator modules arranged between a rotor and a stator. The rotor may be coupled to and/or integrated with a turbine that is configured to rotate in the presence of a fluid stream such as wind or water. Each generator module may have a rotor portion configured to generate a magnetic field having at least one characteristic that changes with respect to the rotational speed of the rotor. Each generator module may further have a stator portion configured to generate an alternating electric current responsive to the magnetic field. The generated electric current may be controlled by the stator portion of the generator module in order to magnetically control the rotational speed of the rotor and the turbine. Separation between the rotor and stator portions of the generator module may be magnetically maintained.

7 Claims, 17 Drawing Sheets

Related U.S. Application Data

(60) Provisional application No. 61/414,732, filed on Nov. 17, 2010, provisional application No. 61/310,234, filed on Mar. 3, 2010, provisional application No. 60/870,886, filed on Dec. 20, 2006.

(51) Int. Cl.

| | | |
|---|---|---|
| *B60L 13/04* | (2006.01) | |
| *F03D 9/00* | (2016.01) | |
| *H02K 7/09* | (2006.01) | |
| *H02P 25/22* | (2006.01) | |
| *H02K 7/18* | (2006.01) | |
| *H02P 9/00* | (2006.01) | |
| *H02K 16/00* | (2006.01) | |

(52) U.S. Cl.
CPC .............. *H02K 7/1823* (2013.01); *H02P 9/008* (2013.01); *H02P 25/22* (2013.01); *B60L 2220/58* (2013.01); *F05B 2210/16* (2013.01); *H02K 16/00* (2013.01); *H02K 2201/15* (2013.01); *H02K 2213/12* (2013.01); *Y02E 10/725* (2013.01); *Y02T 10/641* (2013.01)

(56) References Cited

U.S. PATENT DOCUMENTS

| | | | |
|---|---|---|---|
| 4,866,321 A * | 9/1989 | Blanchard | H02K 21/24 310/112 |
| 5,189,961 A | 3/1993 | Fujie | |
| 5,287,026 A | 2/1994 | Ogihara et al. | |
| 5,388,527 A | 2/1995 | Thornton | |
| 5,682,139 A | 10/1997 | Pradeep et al. | |
| 5,865,123 A | 2/1999 | Powell et al. | |
| 5,899,036 A | 5/1999 | Seiber et al. | |
| 6,510,799 B2 | 1/2003 | Lamb et al. | |
| 6,570,273 B2 | 5/2003 | Hazelton | |
| 6,781,276 B1 | 8/2004 | Stiesdal et al. | |
| 6,841,892 B1 * | 1/2005 | Le Nabour | F03D 1/04 290/43 |
| 6,899,036 B2 | 5/2005 | Lamb et al. | |
| 7,204,192 B2 | 4/2007 | Lamb et al. | |
| 7,303,369 B2 | 12/2007 | Rowan et al. | |
| 7,334,525 B2 | 2/2008 | Jeter et al. | |
| 7,400,052 B1 | 7/2008 | Badger | |
| 7,453,166 B2 | 11/2008 | Power et al. | |
| 7,816,830 B2 | 10/2010 | Dickes | |
| 7,902,687 B2 * | 3/2011 | Sauer | F03B 13/12 290/54 |
| 7,964,978 B1 | 6/2011 | Weissmann | |
| 8,171,858 B2 | 5/2012 | Wamble et al. | |
| 8,426,995 B2 | 4/2013 | Langel | |
| 8,803,354 B2 | 8/2014 | Wamble, III et al. | |
| 2003/0137149 A1 * | 7/2003 | Northrup | F03D 9/002 290/44 |
| 2003/0164654 A1 | 9/2003 | Thaxton et al. | |
| 2004/0100102 A1 | 5/2004 | Wobben | |
| 2004/0160063 A1 * | 8/2004 | Le Nabour | F03D 1/04 290/55 |
| 2005/0184689 A1 | 8/2005 | Maslov et al. | |
| 2006/0012182 A1 | 1/2006 | McCoin | |
| 2006/0081150 A1 | 4/2006 | Jeter et al. | |
| 2007/0024147 A1 | 2/2007 | Hirzel | |
| 2008/0088200 A1 * | 4/2008 | Ritchey | H02K 16/00 310/268 |
| 2008/0148990 A1 | 6/2008 | Wamble et al. | |
| 2008/0315709 A1 | 12/2008 | Uchiyama | |
| 2009/0001731 A1 | 1/2009 | Perlo et al. | |
| 2009/0126369 A1 | 5/2009 | Walitzki | |
| 2009/0134628 A1 | 5/2009 | Stiesdal | |
| 2009/0140526 A1 | 6/2009 | Jansen et al. | |
| 2009/0218900 A1 | 9/2009 | Dickes | |
| 2011/0031760 A1 * | 2/2011 | Lugg | F03D 1/025 290/55 |
| 2011/0291413 A1 | 12/2011 | Wamble, III et al. | |
| 2012/0133142 A1 | 5/2012 | Langel | |
| 2012/0181793 A1 | 7/2012 | Hein | |
| 2012/0217831 A1 * | 8/2012 | Jore | H02K 1/30 310/90 |
| 2013/0062889 A1 | 3/2013 | Thoresen | |
| 2013/0181553 A1 * | 7/2013 | Wu | H02K 7/1838 310/53 |
| 2015/0244220 A1 * | 8/2015 | Yost | H02K 1/2793 310/156.12 |
| 2015/0256050 A1 * | 9/2015 | Muniz Casais | H02K 1/185 310/156.12 |
| 2016/0036308 A1 * | 2/2016 | Bailey | H02K 21/024 290/45 |

OTHER PUBLICATIONS

International Electrotechnical Commission; "Wind Turbine—Part 1: Design Requirements," International Standard IEC 61400-1, 2005-2008, pp. 1-92, 3rd Edition, Geneva Switzerland.

Veers, Paul S., "Modeling Stochastic Wind Loads on Vertical Axis Wind Turbines," Sandia Report SAND83-1909, 1984, pp. 1-19, Sandia National Laboratories, Albuquerque, NM, USA.

Final Office Action mailed Jun. 10, 2011; in U.S. Appl. No. 11/960,605.

Final Office Action mailed Mar. 4, 2010; in U.S. Appl. No. 11/960,605.

Non-Final Office Action mailed Jun. 4, 2009; in U.S. Appl. No. 11/960,605.

Non-Final Office Action mailed Sep. 14, 2010; in U.S. Appl. No. 11/960,605.

Final office Action mailed Oct. 10, 2012; in U.S. Appl. No. 13/040,195.

Notice of Allowance and Fee(s) Due mailed Dec. 27, 2011; in U.S. Appl. No. 11/960,605.

Non-Final Office Action mailed Mar. 6, 2012; in U.S. Appl. No. 13/040,195.

Notice of Allowance and Fee(s) Due mailed Jun. 10, 2013; in U.S. Appl. No. 13/040,195.

Notice of Allowance and Fee(s) Due mailed Mar. 31, 2014; in U.S. Appl. No. 13/040,195.

Non-Final Office Action mailed Jan. 20, 2012; in U.S. Appl. No. 13/040,195.

* cited by examiner

FLUID TURBINE MODULAR ELECTRIC GENERATOR INCLUDING REMOVABLE STATOR MODULES WITH INTEGRATED POWER ELECTRONICS AND MAGNETIC BEARING SYSTEM

CROSS REFERENCE TO RELATED APPLICATIONS

This application is a continuation of U.S. application Ser. No. 13/040,195, now U.S. Pat. No. 8,803,354, filed Mar. 3, 2011, which claims benefit of U.S. Provisional Patent Application No. 61/414,732 filed Nov. 17, 2010 and U.S. Provisional Patent Application No. 61/310,234 filed Mar. 3, 2010; U.S. patent application Ser. No. 13/040,195 is a continuation in part of U.S. patent application Ser. No. 11/960,605, now U.S. Pat. No. 8,171,858, filed Dec. 19, 2007, which claims benefit of U.S. Provisional Application No. 60/870,836 filed Dec. 20, 2006, all of the above applications are hereby incorporated herein in herein by reference in their entirety.

BACKGROUND

From lighting and heating to electrolysis and electric motors, electric power is employed in an ever increasing number of applications in residential, commercial and industrial sectors. This demand for electric power is met by a wide variety of electric power generation systems ("generation systems") including coal and gas-fired power plants, nuclear power plants, hydroelectric power stations and wind turbines. However, conventional generation systems have disadvantages. For example, some conventional generation systems consume nonrenewable, fuels and/or have adverse environmental impacts such as associated pollution and/or hazardous waste. Some conventional generation systems avoid these disadvantages, but have other shortcomings.

For example, some conventional generation systems generate electric power based on renewable fluid streams such as wind, renewable water flows including tidal and wave-associated water flows, and geothermally heated fluid streams. Such renewable fluid streams may be naturally occurring or naturally assisted, and may have characteristics such as flow rate and power density that vary significantly and/or depend on geographic location. Such variability of fluid stream characteristics can present a challenge to designers of conventional generation systems, and some conventional generation systems are designed to operate efficiently and/or effectively only within a relatively narrow range of characteristic values. For example, wind quality available at different geographical locations may be classified by average power density or wind speed, and conventional wind turbines may require particular classes of wind to operate efficiently and/or effectively. Such limitations on conventional generation system designs may significantly constrain the geographical regions suitable for the generation systems and/or be associated with significant electric power transmission costs.

Some conventional generation systems attempt to expand the range of operationally suitable characteristic values by incorporating variable pitch turbines. However, variable pitch turbines can be significantly more expensive and/or less reliable than fixed pitch turbines. Some conventional generation systems attempt to expand the range of operationally suitable characteristic values by incorporating a mechanical gearbox. However, such gearboxes can be a significant portion of the purchase and/or maintenance cost of the system. Some conventional generation systems are custom manufactured to perform efficiently and/or effectively with respect to expected ranges of characteristic values at particular geographical locations. However, such custom manufacture can be significantly more expensive and/or require significantly longer to manufacture and/or maintain relative to designs amenable to mass production techniques.

SUMMARY

An electric power generation system may be constructed of multiple similar generator modules arranged between a rotor and a stator. The rotor may be coupled to and/or integrated with a turbine. The turbine may be configured to rotate in the presence of a fluid stream such as wind or water. A rotational speed of the turbine may vary depending on a flow rate of the fluid stream. A rotational speed of the rotor may correspond to the rotational speed of the turbine. The coupling of the turbine and rotor need not include a mechanical gearbox configured to mediate the rotational speed of the rotor with respect to the rotational speed of the turbine. Each generator module may have a rotor portion coupled to the rotor and configured to generate a magnetic field having at least one characteristic that changes with respect to the rotational speed of the rotor. Each generator module may further have a stator portion coupled to the stator and configured to generate an alternating electric current responsive to the magnetic field. The generated electric current may be controlled by the stator portion of the generator module in order to magnetically control (e.g., decelerate) the rotational speed of the rotor and the turbine. Separation between the rotor and stator portions of the generator module may be magnetically maintained.

As part of magnetically controlling the rotational speed of the rotor and turbine, values of one or more characteristics of the rotor and/or generated electric current may be measured. Target values for those characteristics may be determined. For example, particular target values of the generated electric current may correspond to particular rotational speeds of the rotor and/or the turbine. An optimal value of the rotational speed of the turbine may exist with respect to a given flow rate of the fluid stream. Target values of the characteristics of the generated electric current may be selected to correspond to the optimal value of the rotation speed of the turbine. The generator modules of a generator may act individually and/or collectively to achieve the target values.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. Other objects and/or advantages of the present invention will be apparent to one of ordinary skill in the art upon review of the detailed description of the present invention and the included figures.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

Figure 1:
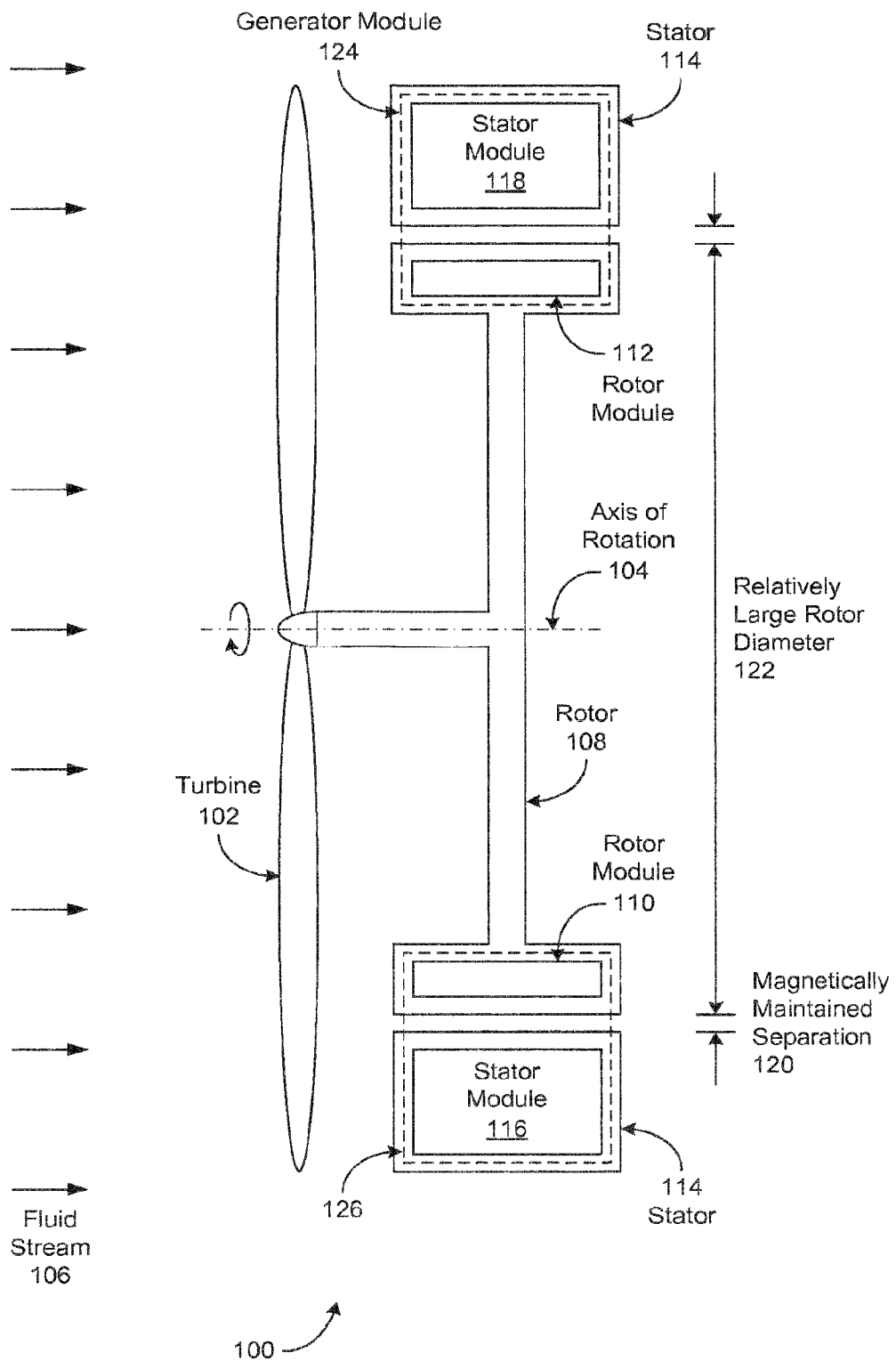
FIG. 1 is a cross-sectional diagram depicting aspects of an example electric-generator in accordance with some embodiments of the present invention.

In an embodiment of the invention, mass produced generator modules may be arranged between a rotor and a stator to generate electric power. Electric generators of widely varying sizes and/or capacities (e.g., 100 kW to 20 MW) may be constructed with different numbers of the generator modules and, optionally, larger rotor and/or stator frames. The generator modules may be arranged in rings and/or layers, radially and/or axially. The rotor frame may be coupled to a turbine configured to rotate in a fluid stream. For example, the fluid stream may be a renewable fluid stream having variable characteristics such as wind, and the turbine may be a fixed pitch turbine. An electric generator incorporating the generator modules may adapt to changes in a rotational speed of the turbine and/or a corresponding torque resulting from the fluid stream with a magnetically-induced counter-torque and without use of a mechanical gearbox.

Each generator module may have a rotor portion ("rotor module") coupled to the rotor frame and a stator portion ("stator module") coupled to the stator frame. Separation of the rotor modules and the stator modules during rotation of the rotor may be maintained substantially with magnetic bearings. Each generator module may include a polyphase alternating current (AC) generator coil and a power electronics submodule configured at least to modify the generated electric voltage and/or current waveforms so as to maintain the rotational speed of the turbine at a desired and/or optimal value with respect to a flow rate of the fluid stream and the capabilities of the generator. The generator may incorporate a central controller to coordinate the power electronics of the generator modules and/or the generator modules may act independently. The generator modules may be hot-swapped for maintenance purposes. For example, the generator modules of the generator may collectively adapt to an unexpected failure, hot-unplug and/or hot-plug of one or more of the generator modules. As is conventional, the terms 'hot-unplug' and 'hot-plug' refer to disconnection and connection, respectively, of a system component while the system is in an operational mode (e.g., generating electricity in the case of an electric generator). In contrast, 'cold-unplug' and 'cold-plug' refer to disconnection and connection, respectively, of a system component once the system has transitioned to a nonoperational mode. As will be apparent to one of skill in the art, transitioning to a nonoperational mode (e.g., for system maintenance) can be undesirable.

An axis of rotation of the turbine may be horizontal or vertical. An axis of rotation of the coupled rotor frame and the rotor modules may correspond to the axis of rotation of the turbine or be arranged perpendicularly, Larger capacity generators (e.g., greater than 10 MW) may be possible when the rotor frame has a vertical axis of rotation. Conventional electric power generator structures may be retrofitted with generator modules to obtain one or more benefits in accordance with an embodiment of the invention. A retrofitted electric power generator structure may have an expanded dynamic range with respect to fluid stream flow rates at which the retrofitted system can operate efficiently and/or effectively. For example, a retrofitted wind turbine may operate effectively at lower wind power densities (e.g., less than 400 Watts per square meter) as well as at higher wind power densities (e.g., greater than 1000 Watts per square meter) and during wind bursts.

FIG. 1 is a cross-section of an example electric generator 100 in accordance with an embodiment of the invention. FIG. 1 is not to scale and omits structural elements for clarity. The electric generator 100 may incorporate a turbine 102 having a horizontal axis of rotation 104 that rotates in the presence of a fluid stream 106. For example, the fluid stream 106 may be air, and the turbine may incorporate one or more airfoil shaped blades. The cross-section of FIG. 1 is from a point of view perpendicular to the axis of rotation 104. The rotational speed of the turbine 102 may vary depending on a flow rate of the fluid stream 106. That is, the turbine 102 may be configured as a variable speed turbine. The turbine 102 may be coupled to a rotor 108 that incorporates multiple rotor modules 110, 112. The rotor 108 may rotate within a stator 114 that incorporates multiple stator modules 116, 118. Separation 120 between the rotor 108 and the stator 114 may be magnetically maintained, for example, with magnetic bearings. The magnetically maintained separation 120 can enable very low losses due to friction, as well as enabling generation of electric power when fluid stream 106 flow rates are relatively low including flow rates at which conventional electric power generation systems would perform sub-optimally or not at all (e.g., below conventional "cut-in" flow rates). The rotor diameter 122 may be relatively large with respect to diameters of rotors in conventional electric power generation systems.

For clarity, the example of a wind power generation system will be used throughout this description. However, each embodiment of the invention is not limited to this example. The fluid stream 106 may be a flow of any suitable fluid including suitable gases such as air and steam, as well as suitable liquids such as water. The term "fluid" is used herein in the technical sense of fluid dynamics, and is not limited to liquids. The mass of the rotor may be concentrated in the rotor modules 110, 112, however, the rotor modules 110, 112 need not have the proportions with respect to the rotor 108 depicted in FIG. 1. As described below in more detail with reference to FIG. 8 and FIG. 9, the rotor modules 110, 112 need not be embedded within the rotor 108, and the stator modules 116, 118 need not be embedded within the stator 114.

Figure 2:
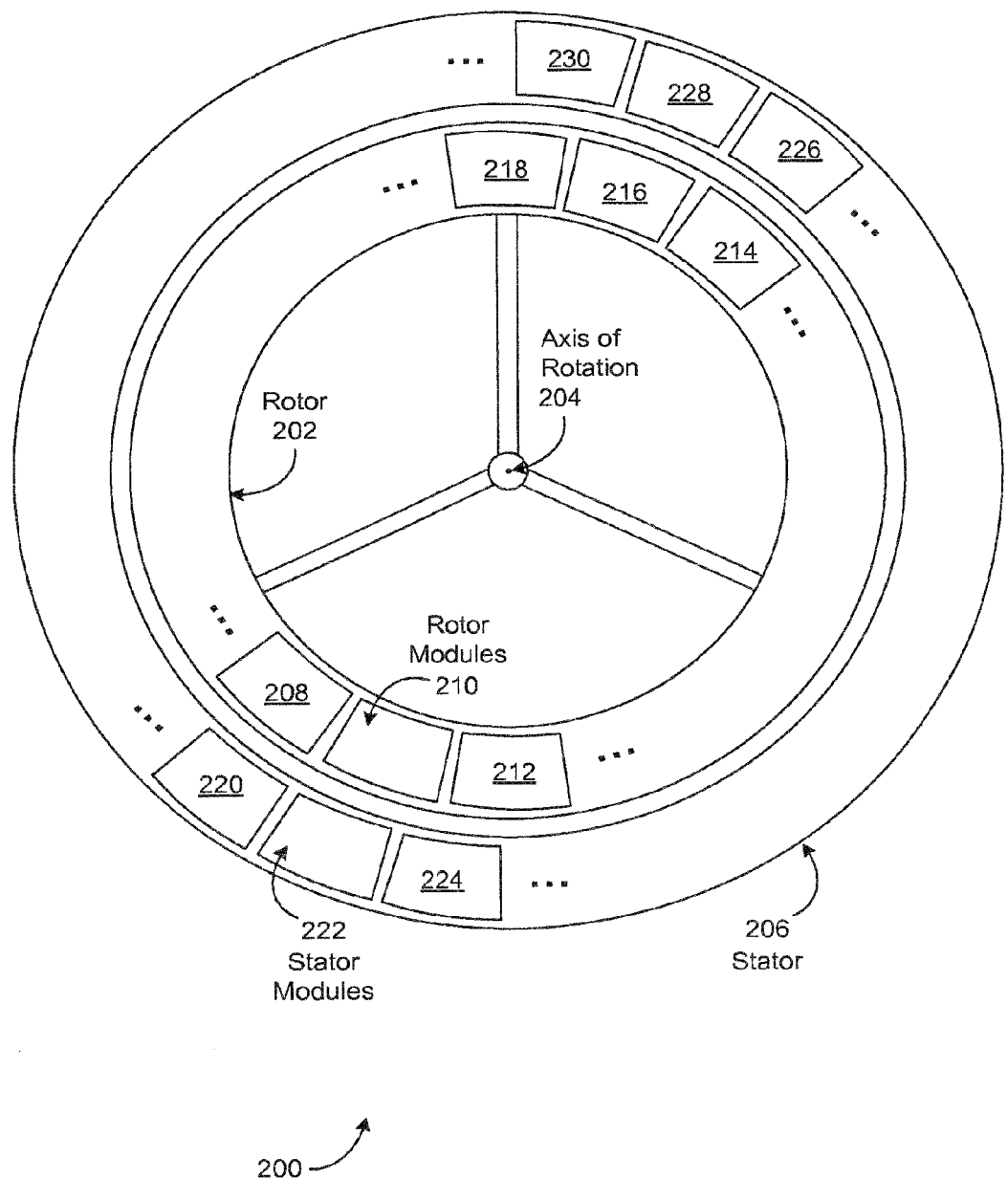
FIG. 2 is a cross-sectional diagram depicting aspects of another example electric generator in accordance with some embodiments of the present invention.

FIG. 2 is a cross-section of another example electric generator 200 in accordance with an embodiment of the invention from an illustrative perspective different from that of FIG. 1. FIG. 2 is not to scale and omits structural elements for clarity. The electric generator 200 includes a rotor 202 rotating about an axis of rotation 204 within a stator 206. The cross-section of FIG. 2 is from a point of view parallel to the axis of rotation 204. The rotor 202 includes multiple rotor modules (e.g., rotor modules 208, 210, 212, 214, 216, 218) arranged in a ring. The stator 206 includes multiple stator modules (e.g., stator modules 220, 222, 224, 226, 228, 230) arranged in a corresponding ring. The ellipses " . . . " between the rotor modules 208 and 218 and between the rotor modules 212 and 214 indicate that the rotor 202 may include any suitable number of rotor modules. Ellipses throughout the drawings have a similar meaning. The rotor modules 208, 210, 212, 214, 216, 218 are examples of the rotor modules 110, 112 of FIG. 1. The stator modules 220, 222, 224, 226, 228, 230 are examples of the stator modules 116, 118 of FIG. 1. In an embodiment of the invention, the ratio of rotor modules 208, 210, 212, 214, 216, 218 to stator modules 220, 222, 224, 226, 228, 230 is one-to-one (1:1), however, each embodiment of the invention is not so limited.

Figure 3:
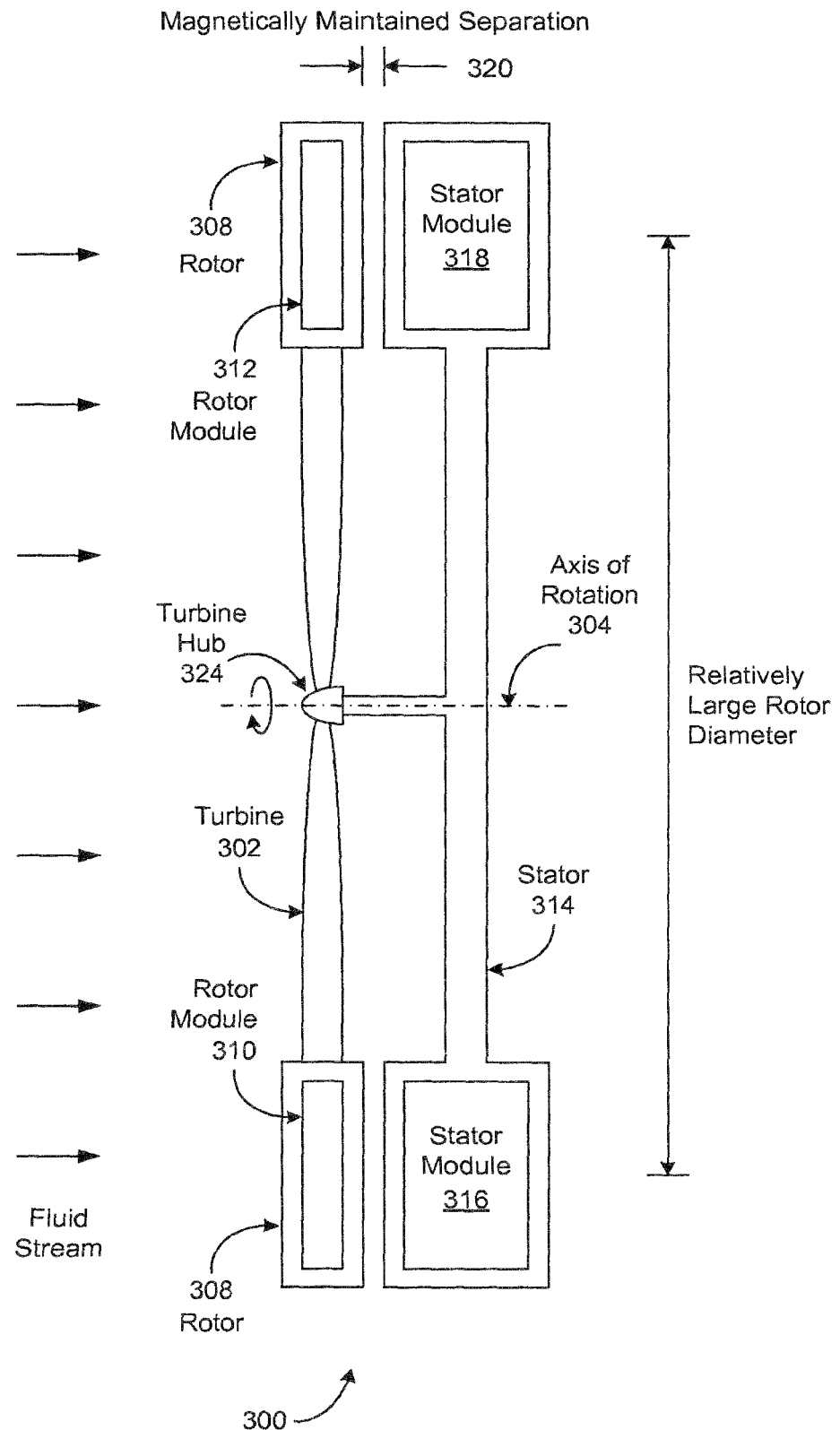
FIG. 3 is a cross-sectional diagram depicting aspects of still another example electric generator in accordance with some embodiments of the present invention.

The electric generators 100 and 200 of FIG. 1 and FIG. 2 have rotors 108 and 202 nested within their respective stators 114 and 206. However, each embodiment of the invention is not so limited. FIG. 3 is a cross-section of still another example electric generator 300 in accordance with an embodiment of the invention. FIG. 3 is not to scale and omits structural elements for clarity. The electric generator 300 includes components 302, 308, 310, 312, 314 and 316, 318 corresponding to the components 102, 108, 110, 112, 114 and 116, 118, respectively, of the electric generator 100 of FIG. 1. However, the arrangement of the components 302, 308, 310, 312, 314 and 316, 318 is different. In the electric generator 300, the rotor 308 and rotor modules 310, 312 may be coupled to and/or integrated with radial extremities of blades of the turbine 302. A hub 324 of the turbine 302 may be coupled with the stator 314, and may incorporate axial and/or radial bearings. Nevertheless, the separation 320 between the rotor 308 and the stator 314 may be substantially magnetically maintained, for example, with magnetic bearings incorporated into the rotor modules 310, 312 and the stator modules 316, 318.

Figure 4:
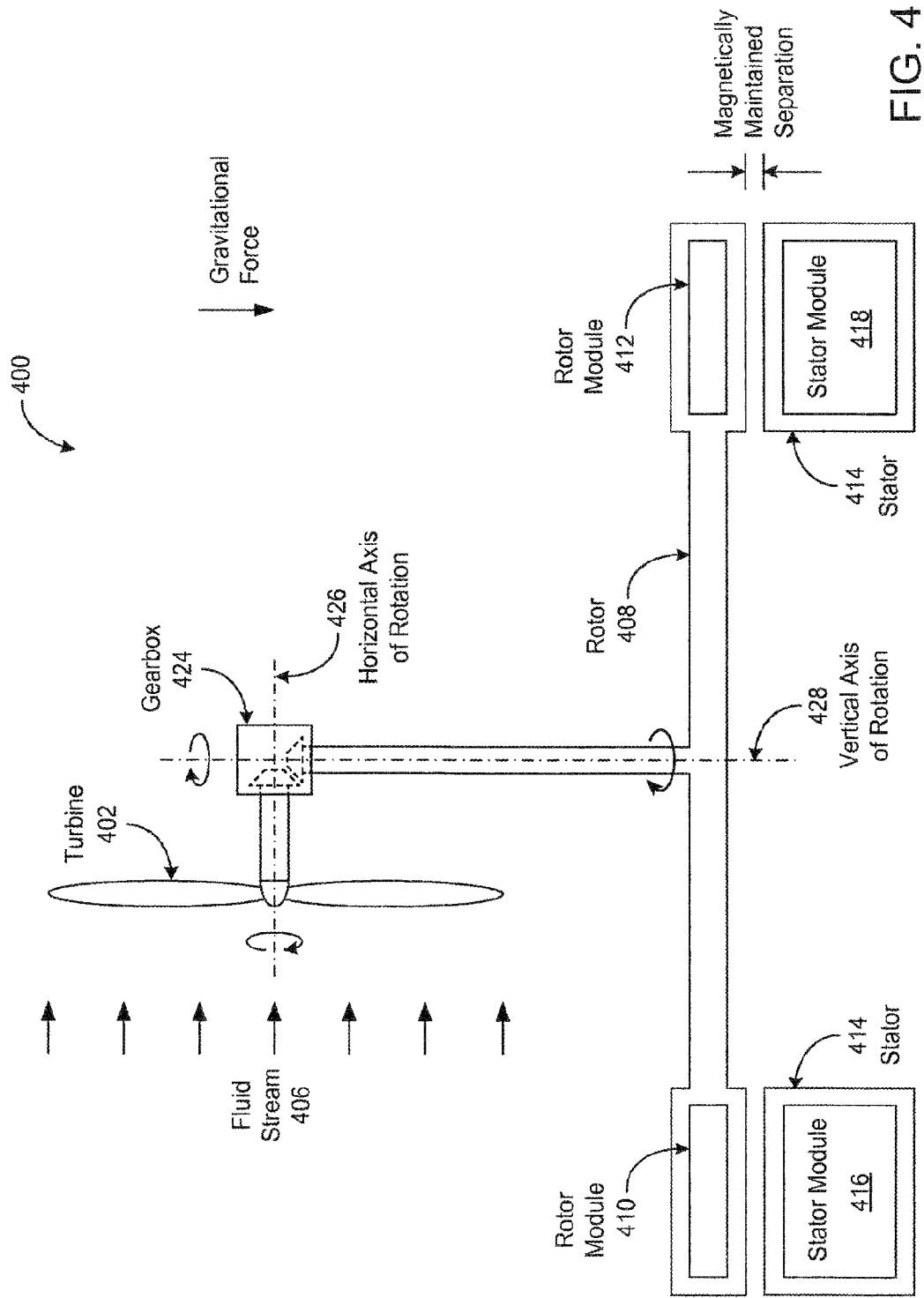
FIG. 4 is a cross-sectional diagram depicting aspects of yet another example electric generator in accordance with some embodiments of the present invention.

When an axis of rotation 304 of the turbine 302 is horizontal (e.g., perpendicular to a local direction of gravitational force), gravitational loading can increase peak stress in particular portions of the generator 300. In an embodiment of the invention, peak stress can be reduced, and thus larger form factors and/or system capacities achieved with same cost materials, by utilizing a rotor with a vertical axis of rotation. FIG. 4 is a cross-section of yet another example electric generator 400 in accordance with an embodiment of the invention. FIG. 4 is not to scale and omits structural elements for clarity. The electric generator 400 includes components 402, 408, 410, 412, 414 and 416, 418 corresponding to the components 302, 308, 310, 312, 314 and 316, 318, respectively, of the electric generator 300 of FIG. 3. In addition, the electric generator 400 includes a gearbox 424 suitable for transferring a torque generated by the turbine 402 rotating around a horizontal axis 426 to a vertical axis of rotation 428 of the rotor 408. The gearbox 424 need not adjust rotational speed, so that a rotational speed of the rotor 408 may correspond to a rotational speed of the turbine 402.

Figure 5:
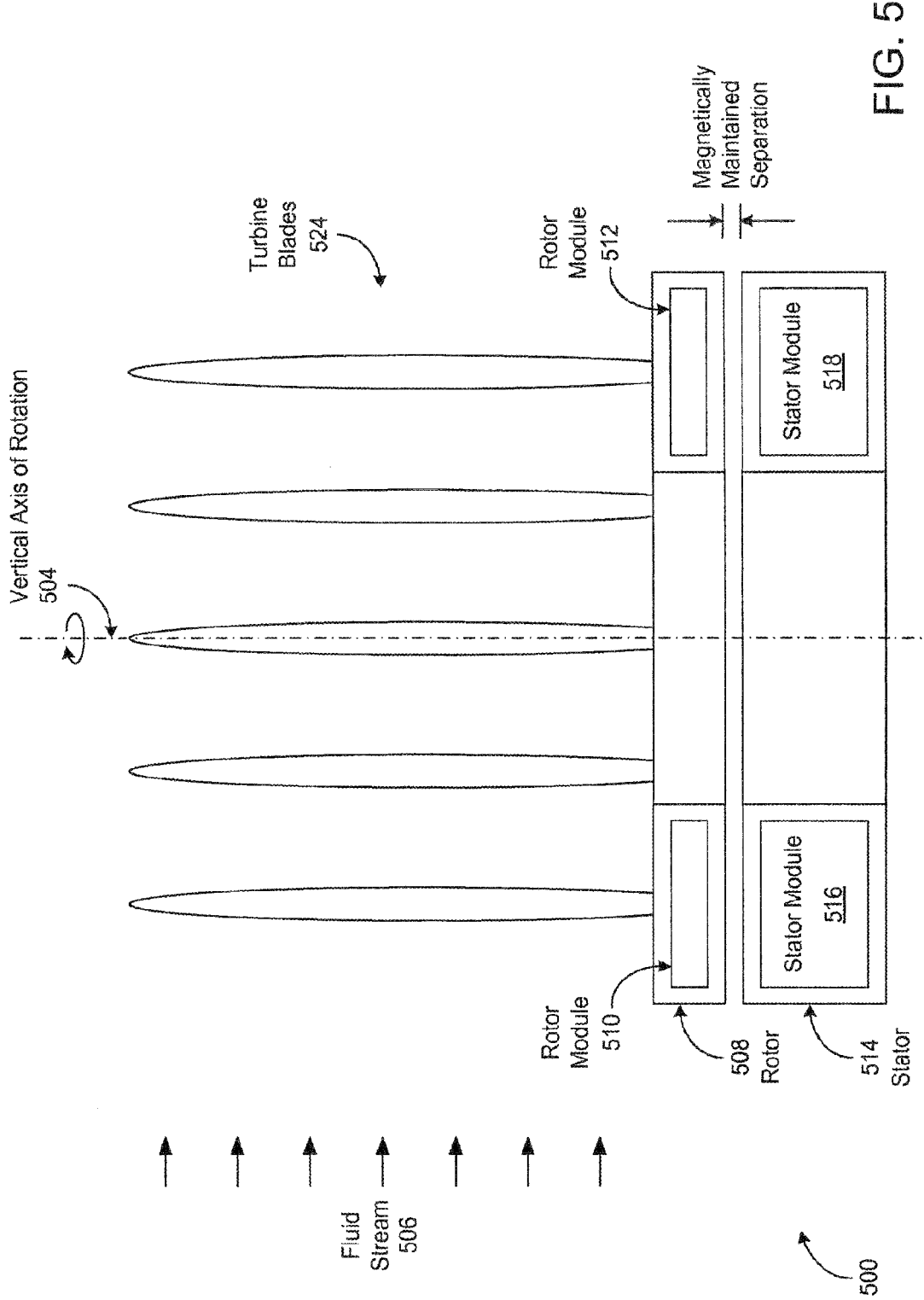
FIG. 5 is a cross-sectional diagram depicting aspects of a further example electric generator in accordance with some embodiments of the present invention.

Alternatively, the gearbox 424 may be eliminated by incorporating a turbine that rotates around the vertical axis 428 in the presence of a fluid stream 406. FIG. 5 is a cross-section of a further example electric generator 500 in accordance with an embodiment of the invention. FIG. 5 is not to scale and omits structural elements for clarity. The electric generator 500 includes components 508, 510, 512, 514 and 516, 518 corresponding to the components 408, 410, 412, 414 and 416, 418, respectively, of the electric generator 400 of FIG. 4. However, the electric generator 500 incorporates turbine blades 524 oriented so as to cause rotation around a vertical axis 504 when in the presence of a fluid stream 506. In the example electric generator 500, the turbine blades 524 are fastened directly to the rotor 508, and so cause the rotor 508 to rotate around the vertical axis 504. However, each embodiment is not so limited, and the turbine blades 524 and/or a turbine frame (not shown in FIG. 5) may be connectively coupled to the rotor 508 in any suitable manner. Furthermore, the turbine blades 524 need not have the number or arrangement depicted in FIG. 5, but may include any suitable number of blades (including one) and may be arranged in any suitable configuration that causes rotation around the vertical axis 504 including configurations corresponding to those found in Darrieus wind turbines and Savonius wind turbines known to those of skill in the art.

Figure 6:
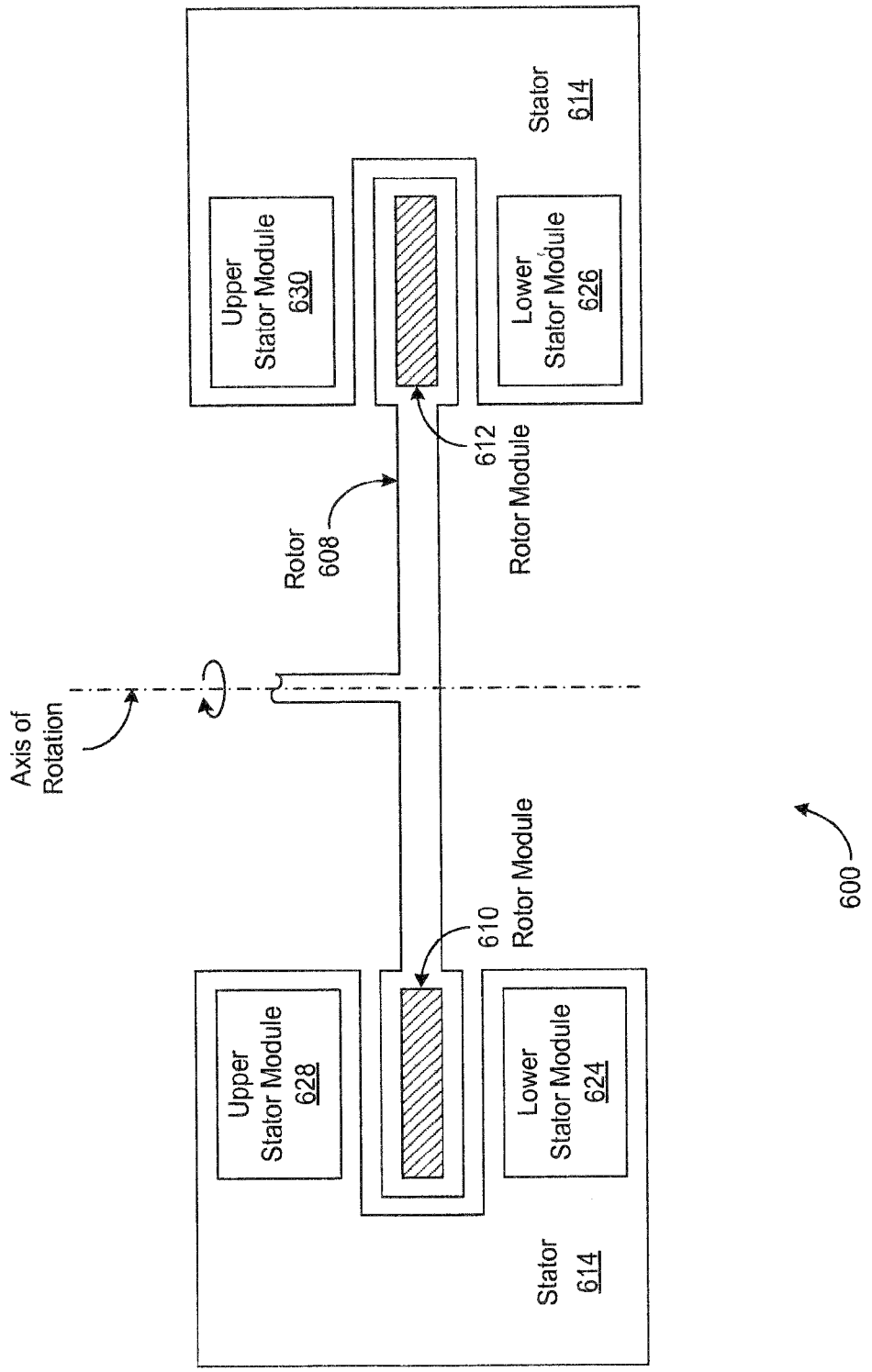
FIG. 6 is a cross-sectional diagram depicting aspects of still another example electric generator in accordance with some embodiments of the present invention.

In the example generators 100, 200, 300, 400, 500 of FIGS. 1, 2, 3, 4, 5, the separation between the rotors and the stators is depicted as being maintained with respect to a single rotor and/or stator surface. However, each embodiment of the invention is not so limited. FIG. 6 is a cross-section of still another example electric generator 600 in accordance with an embodiment of the invention. FIG. 6 is not to scale and omits structural elements for clarity. As in the electric generator 400 of FIG. 4, the electric generator 600 includes a rotor 608 that incorporates multiple rotor modules 610, 612. However, the electric generator 600 incorporates a stator 614 having a shape that requires separation between the stator 614 and the rotor 608 to be maintained with respect to multiple surfaces. The electric generator 600 further includes multiple sets of stator modules (e.g., a set of lower stator modules 624, 626 and a set of upper stator modules 628, 630) to maintain the separation. Such an arrangement may provide for greater separation stability, for example, in response to transient and/or stochastic perturbing forces and/or torques incident upon the rotor 608.

Figure 7:
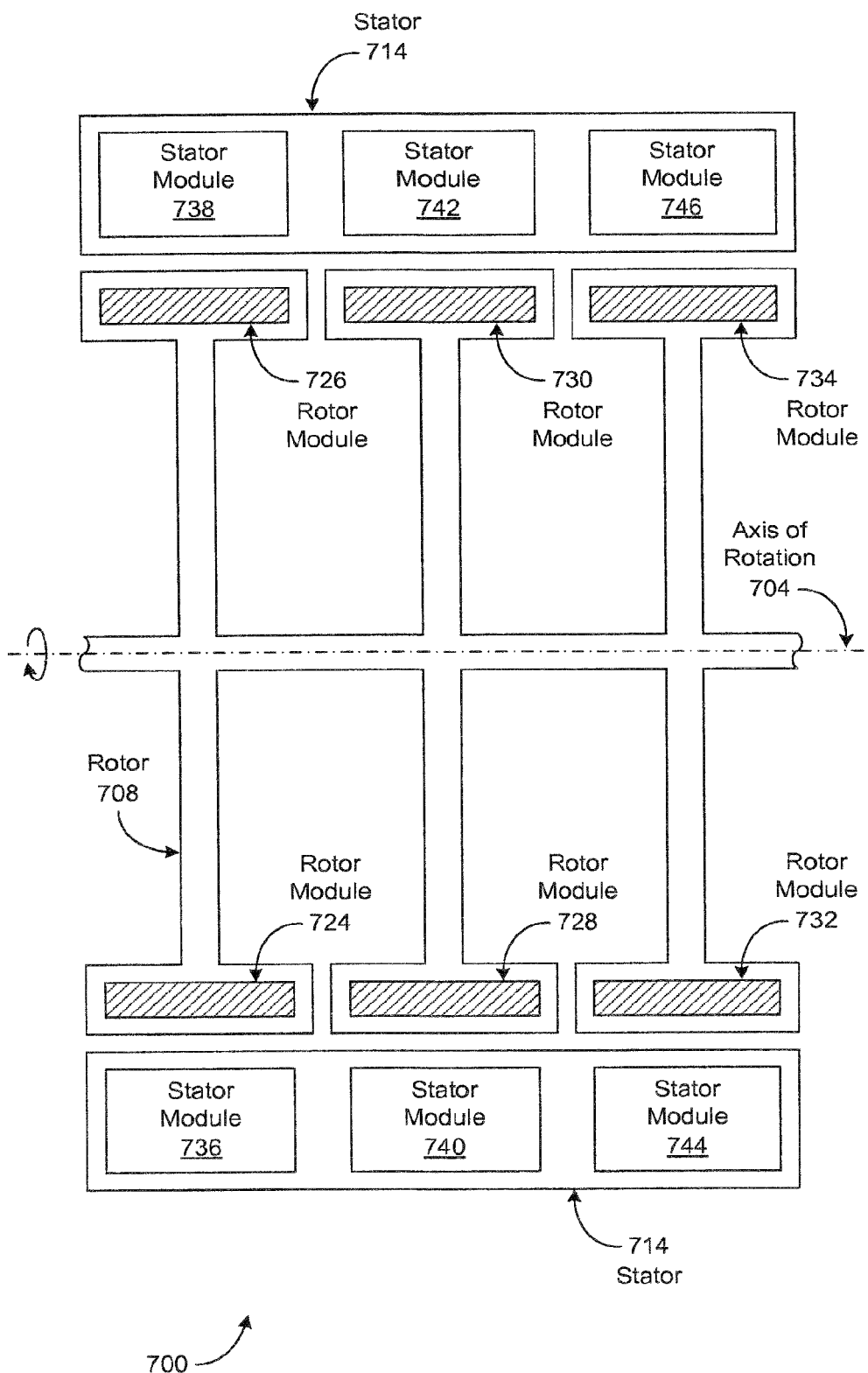
FIG. 7 is a cross-sectional diagram depicting aspects of still yet another example electric generator in accordance with some embodiments of the present invention.

Referring back to FIG. 1, the set of rotor modules 110, 112 together with the set of stator modules 116, 118 is collectively called a set, ring or plate of generator modules 124, 126. In accordance with an embodiment of the invention, an electric generator may include multiple sets of generator modules. FIG. 7 is a cross-section of still yet another example electric generator 700 in accordance with an embodiment of the invention. FIG. 7 is not to scale and omits structural elements for clarity. The electric generator 700 includes a rotor 708 that incorporates multiple sets of rotor modules 724, 726, 728, 730, 732, 734 rotating around a common axis 704. The rotor 708 rotates within a stator 714 that incorporates multiple sets of stator modules 736, 738, 740, 742, 744, 746. Each plate of generator modules may correspond to the plate of generator modules 110, 112, 114, 116 of FIG. 1. High capacity electric generators can be constructed from "stacks" of such plates, for example, as described below in more detail with reference to FIG. 14.

Figure 8:
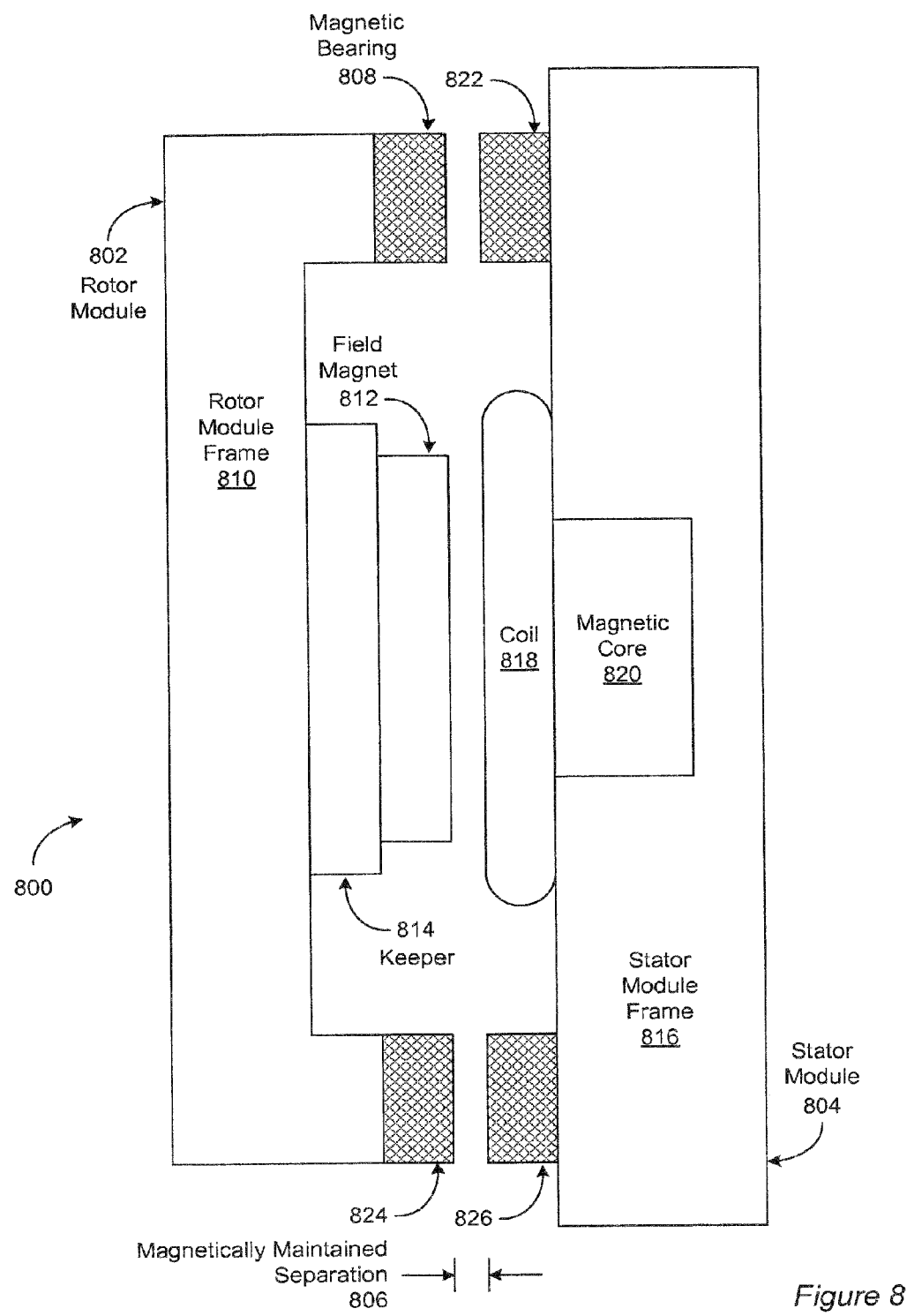
FIG. 8 is a cross-sectional diagram depicting aspects of an example generator module in accordance with some embodiments of the present invention.

The description now turns to generator module components in accordance with an embodiment of the invention. FIG. 8 is a cross-section of an example generator module 800 in accordance with an embodiment of the invention. FIG. 8 is not to scale and omits structural elements for clarity. The generator module 800 includes a rotor module 802 and a stator module 804 having a magnetically maintained separation 806.

The rotor module 802 may incorporate a set of magnetic bearings (e.g., magnetic bearings 808, 822, 824, 826) fastened to a rotor module frame 810 and configured at least in part to maintain the separation 806 between the rotor module 802 and the stator module 804. The rotor module 802 may further incorporate a field magnet 812 connectively coupled to the rotor module frame 810. A magnetic field keeper 814 may be inserted between the field magnet 812 and the rotor module frame 810 and configured at least in part to maintain the magnetic field generated by the field magnet 812.

The stator module 804 may also incorporate a set of magnetic bearings fastened to a stator module frame 816 and configured at least in part to maintain the separation 806 between the rotor module 802 and the stator module 804. The set of magnetic bearings fastened to the rotor module frame 810 and the set of magnetic bearings fastened to the stator module frame 816 may interact and cooperate to maintain the separation 806. The stator module 804 may further include a generation coil 818 configured at least to generate polyphase (e.g., 3 phase) alternating electric current (AC) responsive to a time-varying magnetic field generated at least in part by the field magnet 812. The field magnet 812 may incorporate a set of permanent magnets arranged so as to generate the polyphase alternating electric current in the generation coil 818 as the rotor module 802 is rotated past the stator module 804. The field magnet 812 may incorporate any suitable type of permanent magnet. The stator module frame 816 may incorporate a magnetic core 820 configured at least to enhance a performance of the generation coil 818. For example, the magnetic core 820 may include laminated back-iron and/or ferrite.

The components of the generator module 800 may have manufacturing tolerances such that the separation 806 may be relatively small, for example, on the order of millimeters. This can be significant with respect to sizing and selecting generator module 800 components incorporating permanent magnets because of the strong dependence of magnetic force on distance, as will be apparent to one of skill in the art.

Figure 9:
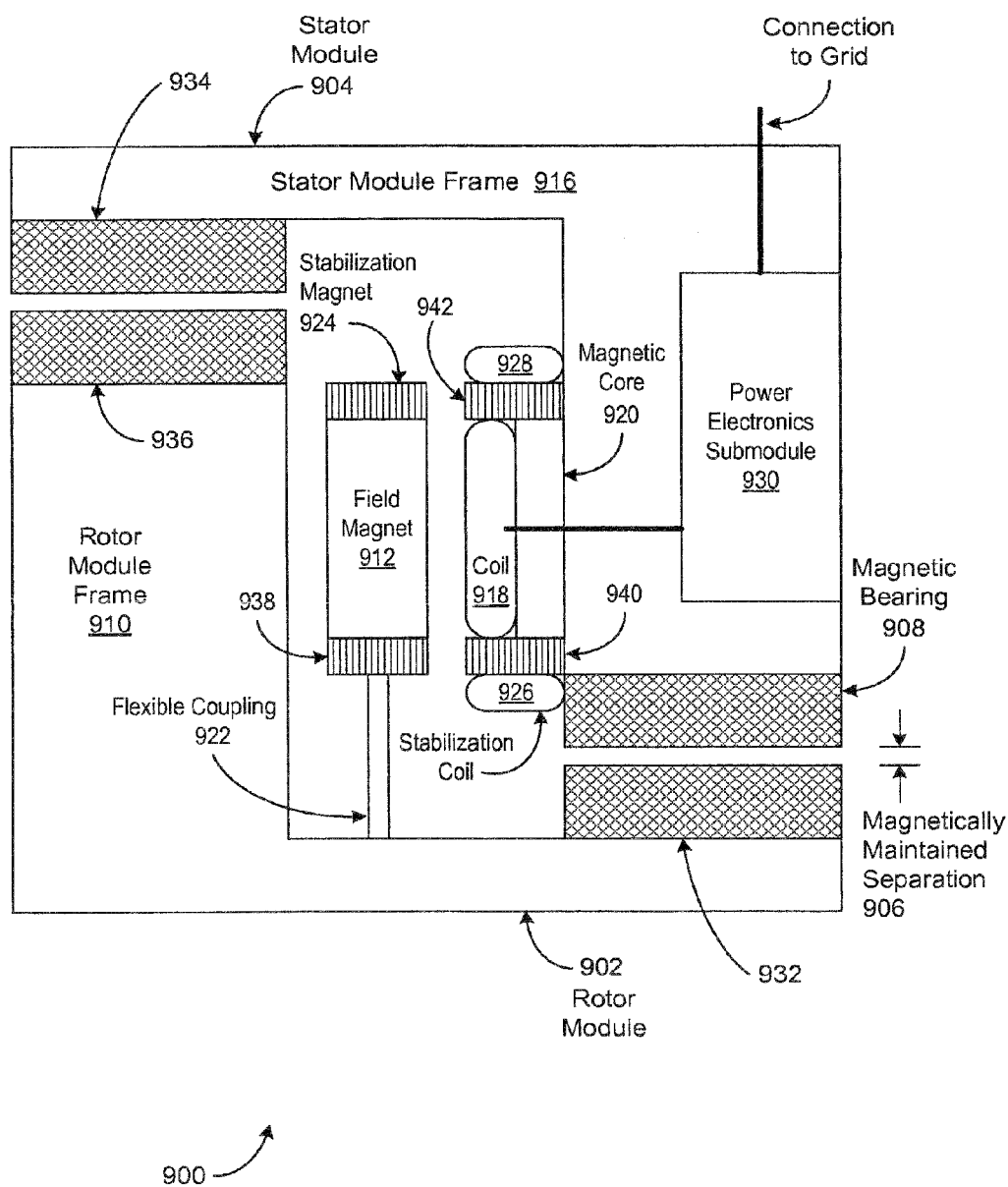
FIG. 9 is a cross-sectional diagram depicting aspects of another example generator module in accordance with some embodiments of the present invention.

FIG. 9 is a cross-section of another example generator module 900 in accordance with an embodiment of the invention. FIG. 9 is not to scale and omits structural elements for clarity. The generator module 900 incorporates components 902, 904, 908, 910, 912, 916, 918 and 920 corresponding to components 802, 804, 808, 810, 812, 816, 818 and 820, respectively, of the generator module 800 of FIG. 8, although differently arranged. Each generator module 900 may have small associated mass and be removed and serviced independent of other components of the generator 100 (FIG. 1). In the generator module 900 of FIG. 9, the magnetic bearings (e.g., components shaded like the magnetic bearings 908) 908, 932, 934, 936 may be sized and/or selected independently from a sizing and/or selection of the field magnet 912 and/or the generator coil 918. The field magnet 912 may be connectively coupled to the rotor module frame 910 with a flexible coupling 922 that provides the field magnet 912 with a freedom to move in a direction parallel with a main magnetic flux path, for example, in the axial direction and/or the radial direction with respect to the axis of rotation 104 (FIG. 1). The flexible coupling 922 may further provide the field magnet 912 with a degree of isolation from vibrations in the rotor module frame 910.

A physical separation between the field magnet 912 and the generation coil 918 may be maintained and/or stabilized (collectively, "stabilized") at least in part by a set of stabilization magnets (e.g., stabilization magnets 924, 938, 940, 942). The separation stabilization may be assisted by a set of stabilization coils 926, 928. Such separation stabilization may create a magnetic well that tightly controls a relative position of the field magnet 912 (e.g., with respect to the generation coil 918). In an embodiment of the invention, the configuration of the generator module 900 allows for the rotor module 902 to move past the stator module 904 at a wide variety of speeds. A magnetically maintained separation 906 between magnetic bearings 908 and 932 is illustrated in FIG. 9.

The polyphase alternating electric current (the "AC waveform") generated in the generation coif 918 by the passage of the rotor module 902 may be managed by a power electronics submodule 930. In an embodiment of the invention, the relative speed of the rotor module 902 with respect to the stator module 904, and thus the generated AC waveform, depends directly on a rotational speed of the turbine 102 (FIG. 1) to which the rotor module 902 is coupled. The power electronics submodule 930 may convert the generated AC waveform into an AC waveform in accordance with local power grid specifications. By managing the AC waveform in the generation coil 918 (e.g., with respect to amplitude, frequency and/or phase), the power electronics submodule 930 may influence a motion of the rotor module 902 and the structures to which the rotor module 902 is connectively coupled such as the turbine 102. For example, the power electronics submodule 930 may act to adjust (e.g., decelerate or accelerate) a rotational speed of the turbine 102 to perform optimally with respect to one or more characteristics (e.g., flow rate, fluid density) of the fluid stream 106. An example power electronics submodule 930 in accordance with an embodiment of the invention is described below in more detail with reference to FIG. 12.

Each generator module 900 may have small associated mass and be removed and serviced independent of other components of the generator 100 (FIG. 1). The generator module 900 may further include one or more active or passive thermal regulation components (not shown in FIG. 9). The generator module 900 may utilize any suitable thermal regulation technology including air or liquid cooling. Each generator module 900 may include sufficient thermal regulation capacity to regulate itself independent of other components of the generator 100.

Figure 10:
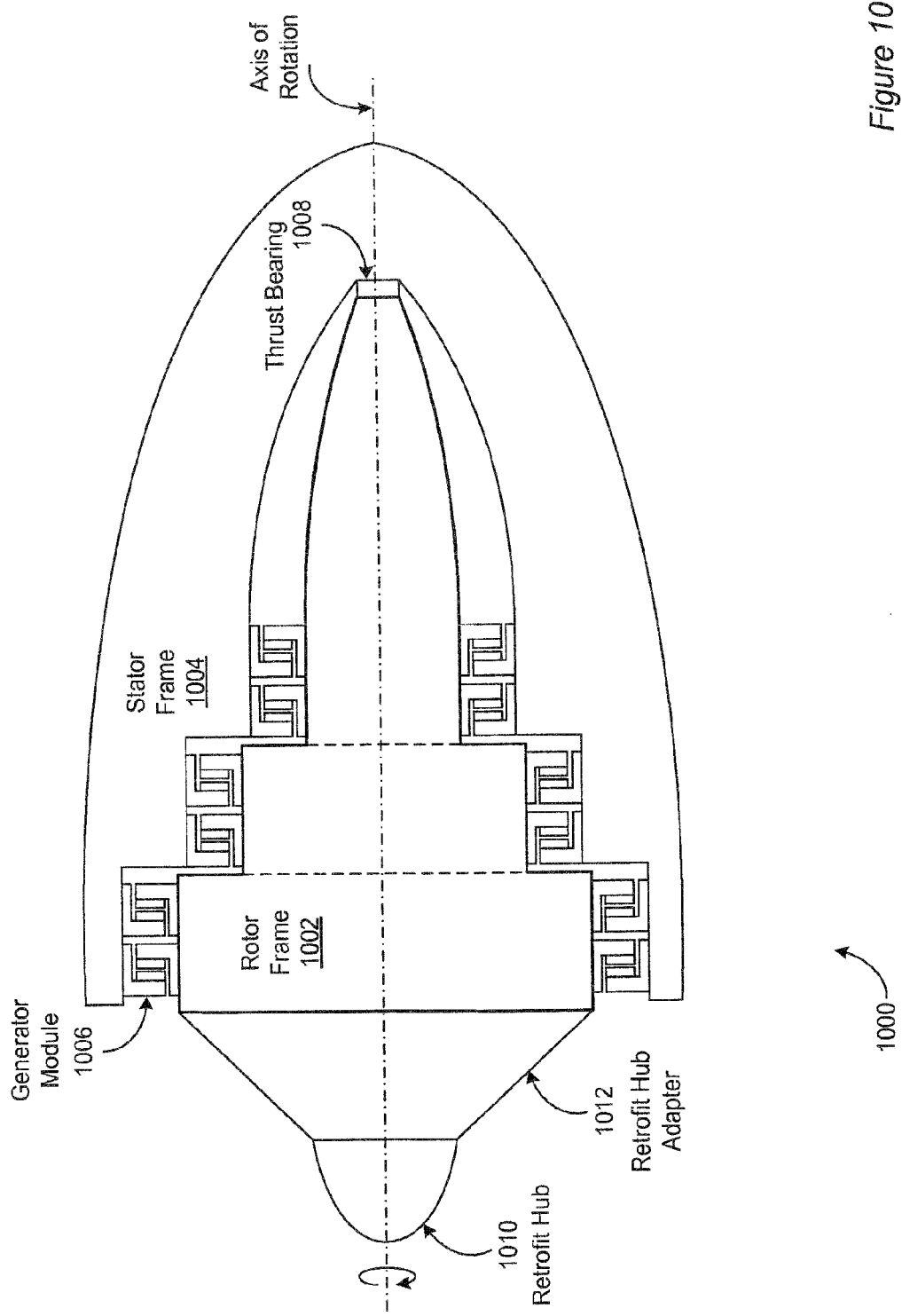
FIG. 10 is a cross-sectional diagram depicting aspects of an example retrofitted electric generator in accordance with some embodiments of the present invention.

In an embodiment of the invention, conventional electric power generation system structures may be retrofitted with generator modules 900. FIG. 10 is a cross-section of an example retrofitted electric power generator 1000 in accordance with an embodiment of the invention. FIG. 10 is not to scale and omits structural elements for clarity. The retrofitted electric power generator 1000 may incorporate a multiple sets of generator modules arranged between a rotor frame 1002 and a stator frame 1004. In FIG. 10, generator module arrangement and/or configuration is depicted with generator module symbol 1006. For example, each such generator module symbol may correspond to the generator module 900 of FIG. 9. As depicted in FIG. 10, sets of generator modules may be layered axially and nested radially to fit a desired form factor. Although the magnetic bearings of the generator modules may act as the main bearings of the generator 1000, the generator 1000 may incorporate a thrust bearing 1008 to facilitate rotation of the rotor frame 1002. Salvaged turbine blades (not shown in FIG. 10) may be reused, recycled and/or retrofitted to the generator 1000 at least in part by connectively coupling the salvaged turbine blades to the rotor frame 1002 with a retrofit hub 1010 and/or retrofit hub adapter 1012.

Each of the rotor frame 1002, the stator frame 1004, the retrofit hub 1010 and the retrofit hub adapter 1012 may be composed of segments capable of being transported through constrained areas and assembled in the field. For example, these components may each have segments determined according to a 3-fold rotational symmetry of the generator 1000. If the generator 1000 incorporates a shroud such as a nacelle shroud (not shown in FIG. 10), the shroud may be similarly segmented. As an alternative to the retrofit hub 1010 and the retrofit hub adapter 1012, corresponding original equipment may be connectively coupled to the rotor frame 1002.

Figure 11:
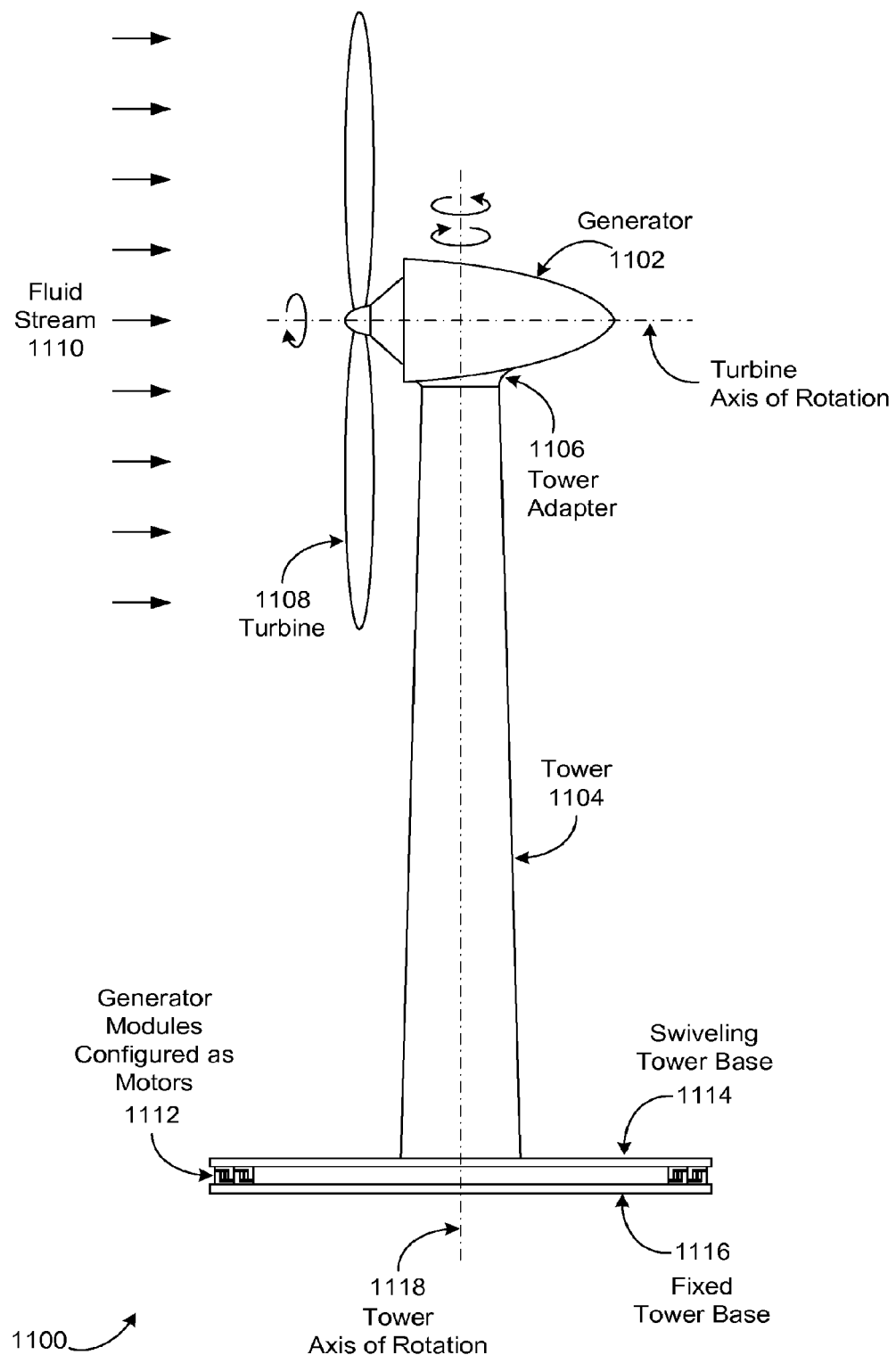
FIG. 11 is a cross-sectional diagram depicting aspects of an example tower-mounted electric power generation system in accordance with some embodiments of the present invention.

In an embodiment of the invention, the power electronics submodule 930 of the generator module 900 (FIG. 9) may be configured to allow the generator submodule 900 to act both as an electric generator and an electric motor. As well as influencing motion of the turbine 102 (FIG. 1), sets of generator modules may be arranged to provide for yaw control of the turbine 102 and thus adapt to changes in direction of the fluid stream 106. FIG. 11 is a cross-section of an example tower-mounted electric power generation system 1100 in accordance with an embodiment of the invention. FIG. 11 is not to scale and omits structural elements for clarity.

A generator 1102 (e.g., corresponding to the generator 1000 of FIG. 10) may be connectively coupled to a tower 1104 with a tower adapter 1106. In an embodiment of the invention, the tower adapter 1106 may be a simple fixed coupling, and yaw control of the turbine 1108 with respect to the fluid stream 1110 may be enabled by a set of generator modules 1112 arranged between a swiveling base 1114 of the tower 1104 and a fixed base 1116 of the tower 1104. The fixed based 1116 may be attached to a suitable foundation embedded in a suitable geologic surface including hill tops, hill sides, river beds and ocean beds. The generator modules 1112 may act as main bearings for the tower 1104 and be configured as motors to rotate the tower 1104 about an axis 1118 responsive to changes in a direction of the fluid stream 1110. In this case, and when larger rotational diameters are available to achieve higher tangential velocities (e.g., in other cases where there is a vertical axis of rotation), the magnetic bearings of the generator module 900 (FIG. 9) may be replaced and/or supplemented with passive magnetic levitation ("passive maglev"). The tower 1104 may be airfoil-shaped to reduce shock experienced by turbine 1108 blades as they rotate past the tower 1104.

Figure 12:
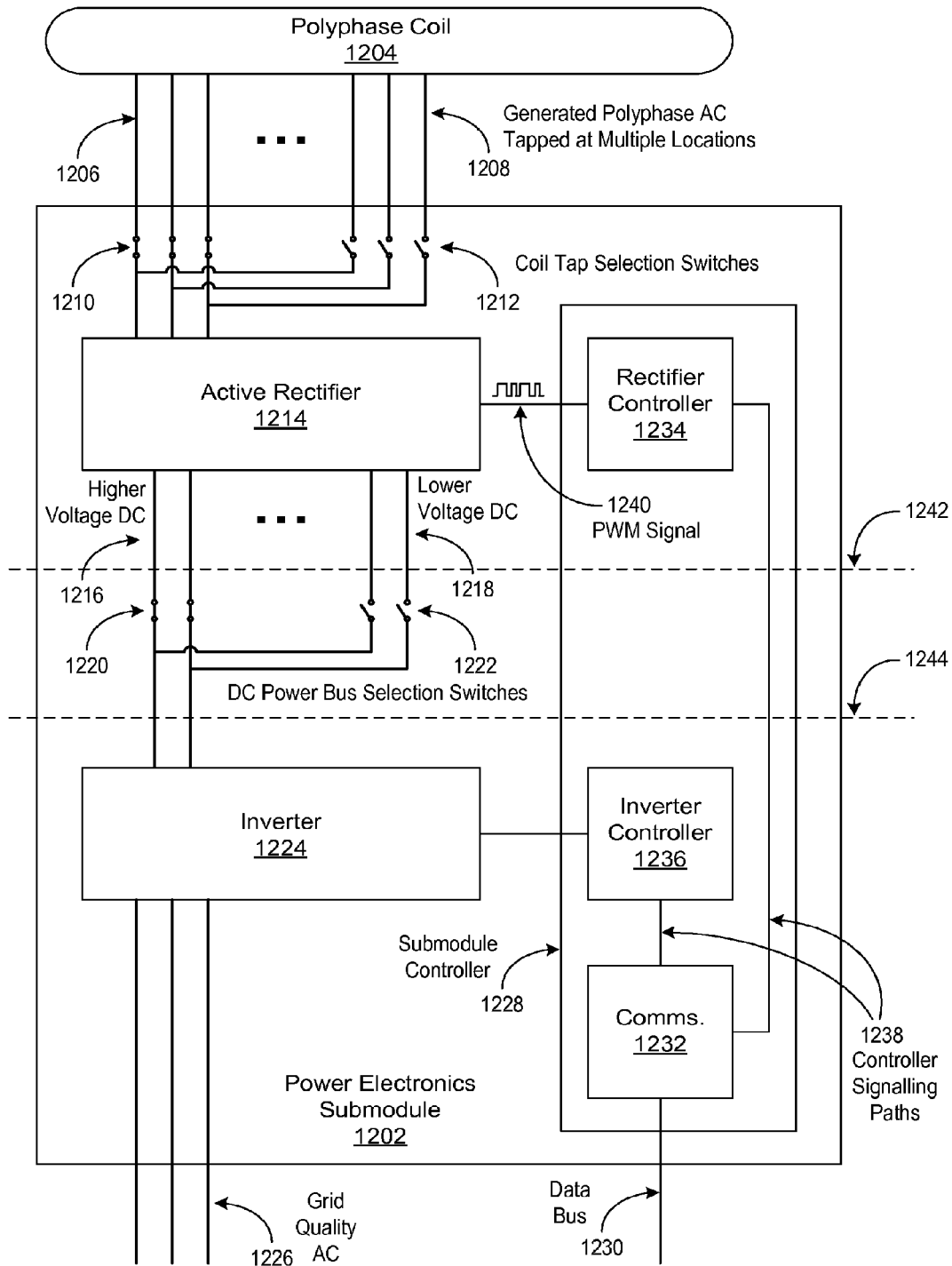
FIG. 12 is a schematic diagram depicting aspects of an example power electronics submodule in accordance with some embodiments of the present invention.

The power electronics submodule 930 (FIG. 9) of the generator module 900 plays a significant role in the performance of the generator module 900. FIG. 12 is a schematic diagram of an example power electronics submodule 1202 in accordance with an embodiment of the invention. A polyphase alternating electric current generation coil 1204 (e.g., the generation coil 918 of FIG. 9) may be tapped at multiple points (e.g., points 1206, 1208) enabling the coil 1204 to adapt to significant variation in rotor module 902 speed. In an embodiment of the invention, this enables electric power generation system design flexibility with respect to location of the rotor module 902 at different distances from the axis of rotation (e.g., as in the generator 1000 of FIG. 10). The power electronics submodule 1202 may include corresponding electronically controlled sets of coil tap selection switches 1210, 1212 that enable the power electronics submodule 1202 to select an appropriate coil tap point.

The AC waveform generated in the polyphase coil 1204 may be presented to an active rectifier 1214. The active rectifier 1214 may be a standardized and easily replaceable component of the power electronics submodule 1202. In an embodiment of the invention, the coil tap selection switches 1210, 1212 may be incorporated into the active rectifier 1214 and/or the active rectifier 1214 may incorporate corresponding power routing to distinct sets of subcomponents designed to manage AC waveforms with different characteristics (e.g., with respect to amplitude and frequency). The active rectifier 1214 may rectify the AC waveform into a direct electric current (DC). The active rectifier 1214 may have multiple DC outputs (e.g., outputs 1216, 1218), for example, corresponding to different voltage and/or current levels. The power electronics submodule 1202 may incorporate corresponding electronically controlled sets of DC power bus selection switches 1220, 1222 that enable the electronics submodule 1202 to select an appropriate DC power routing.

The DC power output by the active rectifier 1214 may be routed to an inverter 1224. The inverter 1224 may be a standardized and easily replaceable component of the power electronics submodule 1202. In an embodiment of the invention, the DC power bus selection switches 1220, 1222 may be incorporated into the inverter 1224 and/or the inverter 1224 may incorporate corresponding power routing to distinct sets of subcomponents designed to manage DC power with different characteristics (e.g., with respect to voltage and/or current levels). The inverter 1224 may transform the routed DC power into a polyphase AC waveform 1226 in accordance with local power grid specifications ("grid-quality AC").

The active rectifier 1214 and/or the inverter 1224 may be configured and/or controlled by a submodule controller 1228 capable of acting in accordance with command messages and/or signals sent over a data bus 1230 to the power electronics submodule 1202. For example, the data bus may be optical fiber or shielded twisted pair (STP). The submodule controller 1228 may include a communication component 1232 capable of participating in sophisticated communication protocols such as Internet protocols. The communication component 1232 may route command messages and/or signals to a rectifier controller 1234 and/or an inverter controller 1236 as appropriate. Alternatively, the communication component 1232 may translate received command messages and/or signals to forms (e.g., simpler forms) suitable for the rectifier controller 1234 and/or the inverter controller 1236. The rectifier controller 1234 and the inverter controller 1236 may translate received command messages and/or signals into command messages and/or signals suitable for controlling the active rectifier 1214 and the inverter 1224, respectively, and/or generate suitable such command messages and/or signals.

For example, the communication component 1232 may receive an internet protocol (IP) message or datagram specifying a current flow rate of the fluid stream 106 (FIG. 1) using Unicode characters. In response, the communication component 1232 may generate a signal voltage over a controller signaling path 1238 to the rectifier controller 1234 that has a level corresponding to the received current flow rate. In response to the signal voltage, the rectifier controller 1234 may generate a pulse-width modulation (PWM) signal 1240 suitable for controlling the active rectifier 1214.

As another example, the communication component 1232 may receive one or more signals corresponding to a rotational speed, and/or other characteristic, of the rotor 108 (FIG. 1) and/or the turbine 102. In response, the communication component 1232 may relay the one or more signals over a controller signaling path 1238 to the rectifier control 1234. Alternatively, the stator module 904 (FIG. 9) may include one or more sensors (not shown in FIG. 9) configured to generate suitable such signals, freeing the communication component 1232 for other tasks.

In an embodiment of the invention, the power electronics submodule 1202 integrated into the generator module 900 (FIG. 9) includes the active rectifier 1214 and the inverter 1224 and outputs grid-quality AC. However, in alternative embodiments, components of the power electronics submodule 1202 may be differently distributed throughout the electric power generation system (e.g., the electric power generation system 1100). For example, in one alternative, the components above the dashed line 1242 may be incorporated in each generator module 900, and then multiple DC power buses 1216, 1218 and a data bus 1230 and/or signaling bus 1238 routed to an inverter 1224 and submodule controller 1228 assigned to multiple generator modules. In another alternative, the components below the dashed line 1244 may be located remotely from the generator modules with the appropriate power and signaling routing.

Figure 13:
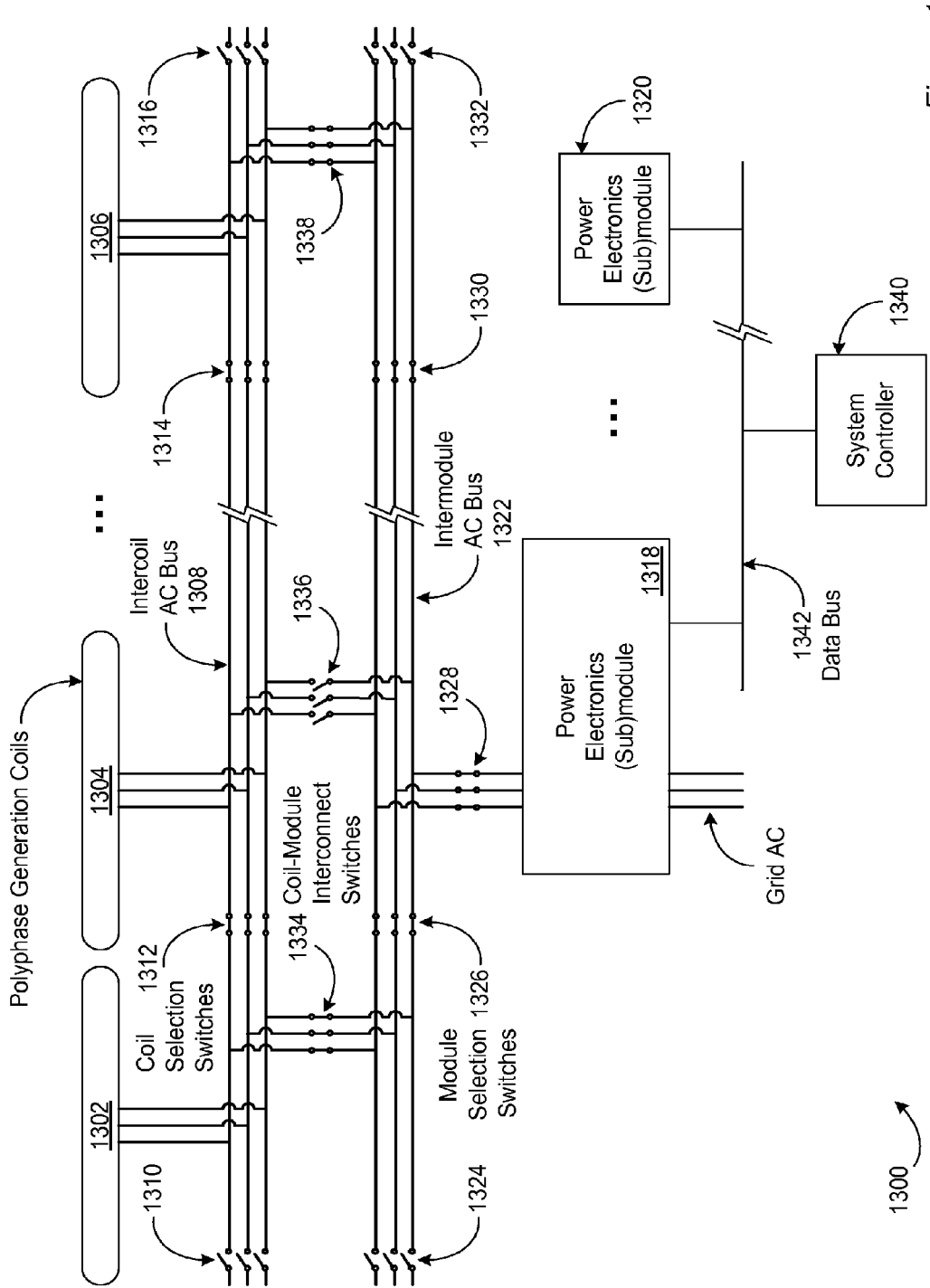
FIG. 13 is a schematic diagram depicting aspects of an example generated AC management network in accordance with some embodiments of the present invention.

In an embodiment of the invention, single power electronics submodules may be configured to manage an AC waveform generated by multiple generation coils such as the polyphase coil 1204. FIG. 13 is a schematic diagram of an example generated AC management network 1300 in accordance with an embodiment of the invention. Multiple polyphase generation coils 1302, 1304, 1306 (such as polyphase generation coil 918 of FIG. 9) may be connected to an inter-coil AC bus 1308. The inter-coil AC bus 1308 may incorporate coil selection switches 1310, 1312, 1314, 1316 enabling selection, isolation, partition and/or grouping of particular sets of generation coils 1302, 1304, 1306. Similarly, multiple power electronics modules 1318, 1320 (such as power electronics submodule 930) may be connected to an inter-module AC bus 1322. The inter-module AC bus 1322 may incorporate module selection switches 1324, 1326, 1328, 1330, '.332 enabling selection, isolation, partition and/or grouping of particular sets of power electronics modules 1318, 1320. The inter-coil AC bus 1308 and the inter-module AC bus 1322 may be connected by a suitable set of coil-module interconnect pathways and switches 1334, 1336, 1338. The network 1300 switches 1310, 1312, 1314, 1316 and 1324, 1326, 1328, 1330, 1332, 1334, 1336, 1338 may be controlled by the power electronics modules 1318, 1320 and/or a system controller 1340 communicatively linked to the power electronics modules 1318, 1320 by a data bus 1342. Different groupings of coils 1302, 1304, 1306 and/or power electronics modules 1318, 1320, and different assignments of such groups, can further expand the dynamic range of the electric power generation system 100 (FIG. 1), for example, with respect to the range of fluid stream 106 flow rates (and thus turbine 102 and rotor 108 rotation speeds) at which the system 100 can generate grid-quality AC.

Each power electronics module 1318, 1320, and/or a stator module that incorporates the power electronics module, may be associated with a data network address (e.g., an internet protocol address), and the system controller 1340 may be located remotely in the data network and/or at a remote physical distance from the power electronics modules 1318, 1320. The system controller 1340 may set any suitable parameters of the power electronics modules 1318, 1320, both individually and collectively. Alternatively, or in addition, functionality of the system controller 1340 may be partially or fully distributed among the power electronics modules 1318, 1320, for example, in accordance with distributed computing techniques well known to those of skill in the art. The power electronics modules 1318, 1320 may share status data with each other. Individual power electronics modules 1318, 1320 may adjust their settings based on status data received from a particular set of neighboring power electronics modules 1318, 1320. The set of neighbors may be fixed or automatically determined and/or re-determined, for example, in accordance with a network peer discovery protocol and/or overlay network protocol.

Figure 14:
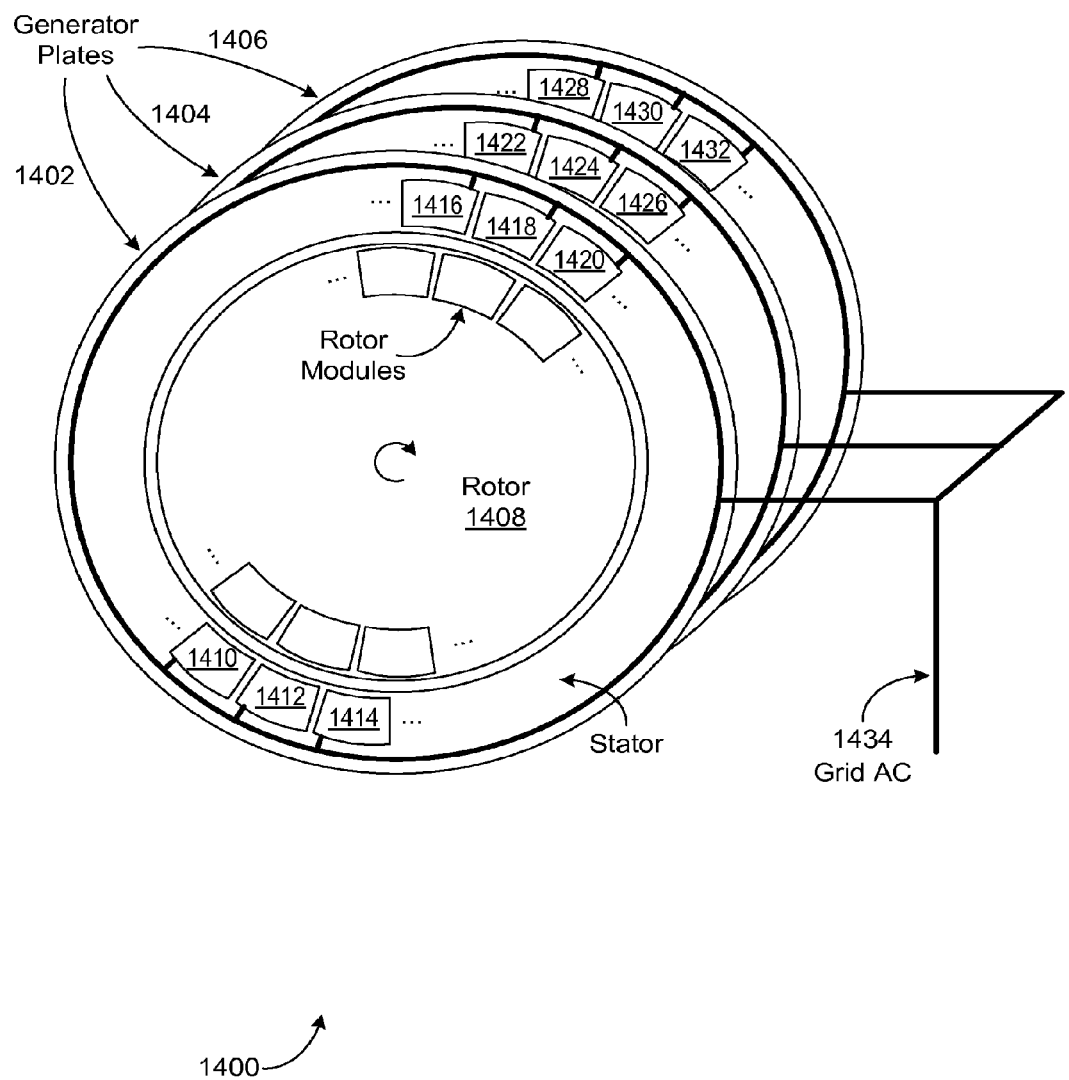
FIG. 14 is a schematic diagram depicting aspects of an example generator module plate stack in accordance with some embodiments of the present invention.

As described above with reference to FIG. 7, high capacity generators may be constructed from stacks of plates of generator modules. FIG. 14 is a schematic diagram of an example generator module plate stack 1400 in accordance with an embodiment of the invention. The stack 1400 includes multiple generator plates 1402, 1404, 1406 having a common rotor 1408. In the illustrated example, the stator modules 1410, 1412, 1414, 1416, 1418, 1420, 1422, 1424, 1426, 1428, 1430, 1432 all output grid-quality AC 1434, which may be simply routed to the local power grid. Alternatively, as described above with reference to FIG. 12, DC power may be routed to a collective inverter or set of inverters to produce the grid-quality AC 1434.

The description now turns to steps that may be performed in accordance with an embodiment of the invention. Such steps may be implemented with any suitable number and type of electronic components. Examples of suitable electronics components include resistors, capacitors, inductive devices, semiconductor switching devices such as diodes, thyristors and transistors, integrated circuits (ICs) including analog ICs and digital ICs such as processors, volatile memory, non-volatile memory, and programmable logic devices, switches, excessive current and/or voltage protection devices, transducers, and optoelectronic devices. Processors and programmable logic devices may be programmed with any suitable programming language and/or computer-executable instructions.

Figure 15:
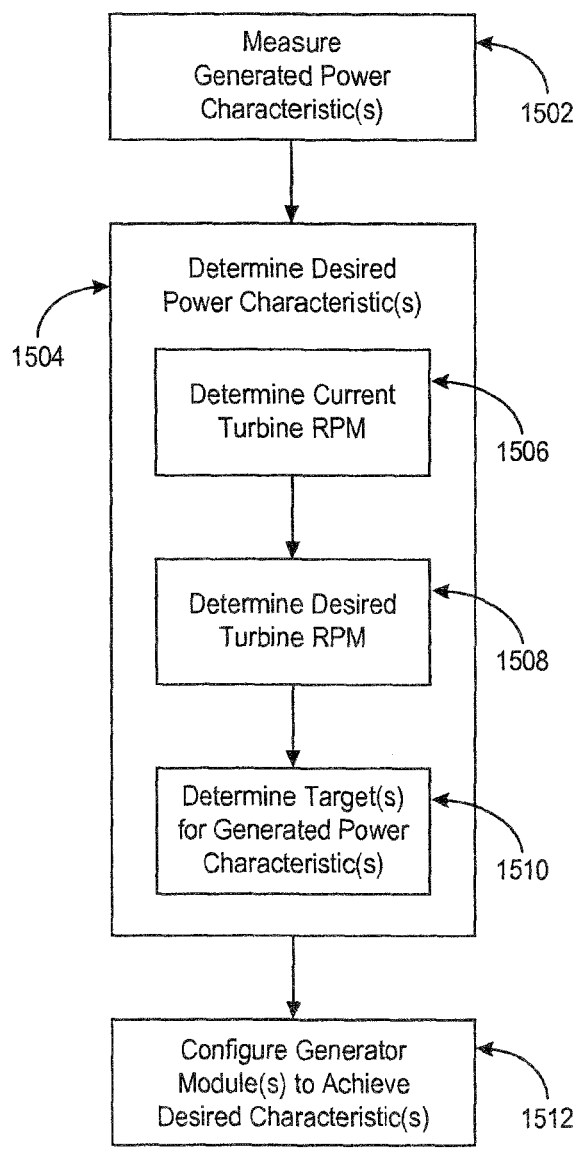
FIG. 15 is a flowchart depicting example steps for generating electric power in accordance with some embodiments of the present invention.

FIG. 15 depicts example steps for generating electric power in accordance with an embodiment of the invention. At step 1502, one or more generated power characteristics may be measured. For example, the power electronics submodule 930 (FIG. 9) may measure one or more characteristics of the AC waveform generated in the coil 918 and/or the DC power output from the active rectifier 1214 (FIG.

12). Such characteristics may include amplitude (e.g., amplitude current), frequency and phase of the voltage and/or current waveforms. Alternatively, or in addition, individual power electronics modules 1318, 1320 (FIG. 13) may provide measurement data to the system controller 1340, and the system controller 1340 may process the measurement data to take system-level measurements of the generated electric power.

At step 1504, one or more desired power characteristics may be determined. For example, the power electronics submodule controller 1228 (FIG. 12) may determine a desired set of characteristics for the AC waveform in the coil 918 (FIG. 9) and/or the DC power output from the active rectifier 1214 based at least in part on the characteristic(s) measured at step 1502, as well as the configuration of the generator 100 of FIG. 1 (e.g., coil groupings) and factors such as fluid stream 106 flow rate and operating temperature. Again, such characteristics may include amplitude, frequency and phase of the voltage and/or current waveforms. At a system level, the system controller 1340 (FIG. 13) may monitor a ratio of commanded to actually generated current and determine the ratio of a highest performing generator module to be used as a target.

One or more intermediate factors may be explicitly determined as part of determined the desired power characteristic(s) of step 1504. For example, rotation speeds (e.g., RPM) of the rotor 108 (FIG. 1) and/or the turbine 102 may be derived from other measurements if not measured directly. At step 1506, current turbine rotational speed may be determined. For example, the power electronics submodule controller 1228 (FIG. 12) may determine the current turbine rotational speed based at least in part on the generated power characteristic(s) measured at step 1502 (e.g., waveform frequency).

At step 1508, a desired turbine rotational speed may be determined. The power electronics submodule controller 1228 (FIG. 12) may determine an optimal turbine rotational speed with respect to a fixed pitch of the turbine 102 and/or a current flow rate of the fluid stream 106 (FIG. 1). For example, the optimal rotational speed of the turbine may be the rotational speed that maximizes power capture for the current flow rate and/or effective flow rate of the fluid stream 106. The turbine 102 and/or rotor 108 may operate with respect to a torque curve (e.g., torque generated responsive to changing rotational speed) having a local slope near a current operating point, and the local slope may be adjusted with a counter-torque induced by managing the generated AC waveform so as to optimize an angle of attack of the turbine 102 blades with respect to the fluid stream 106. In an embodiment of the invention, managing turbine rotational speed may have the effect of flattening the torque and/or power curve and extending the dynamic range of the electric power generation system 100. There may also be maximum rotational speeds that can be reliably and/or safely sustained in the short-term and over longer periods, and the desired turbine rotational speed may be selected in accordance with these limits and enforced by the torque control system (i.e., management of the generated AC waveform).

At step 1510, one or more targets for one or more generated power characteristics may be determined. The power electronics submodule controller 1228 (FIG. 12) and/or the system controller 1340 (FIG. 13) may determine one or more targets for one or more characteristics of the generated AC waveform in the polyphase coil 1204 and/or coil group 1302, 1304, 1306 based at least in part on the desired turbine rotational speed determined at step 1508. For example, a phase shift in the generated AC waveform may magnetically induce a deceleration with respect to the rotational speed of the rotor 108 (FIG. 1) and/or turbine 102.

At step 1512, one or more generator modules may be configured to achieve the desired power characteristic(s) determined at step 1504. For example, the power electronics submodule controller 1228 may configure the power electronics submodule 1202 to seek the target(s) determined at step 1510. In addition, the system controller 1340 may command and/or signal the power electronics submodule controllers of multiple generator modules to seek system-level targets. In an embodiment of the invention, coil groups may be configured to achieve the desired power characteristic(s). As part of measuring the generated power characteristic(s) at step 1502, it may be detected that one or more generator modules, or components thereof, have failed, become inactive (e.g., due to hot-unplugging) and/or are performing sub-optimally. The configuration of step 1512 may compensate appropriately, for example, by rerouting AC and/or DC power and/or adjusting individual generator module settings to redistribute to redistribute and/or decrease the generated power load.

Figure 16:
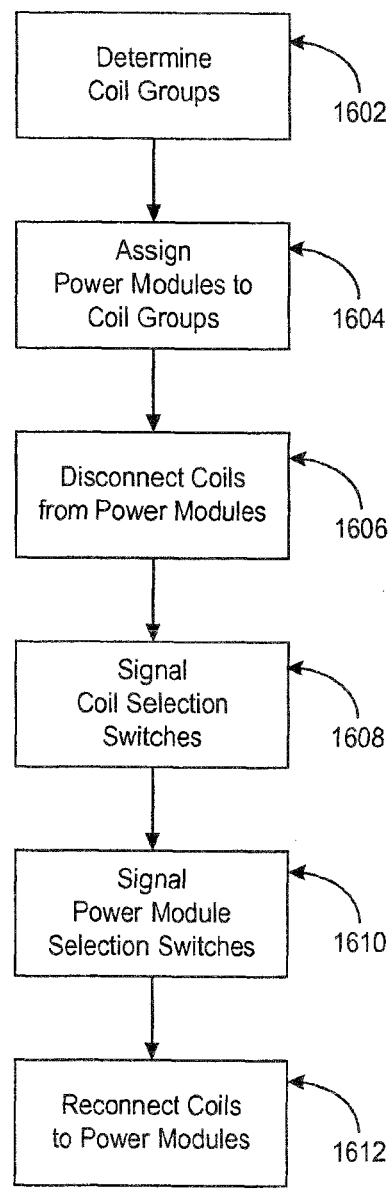
FIG. 16 is a flowchart depicting example steps for configuring generator modules in accordance with some embodiments of the present invention.

FIG. 16 depicts example steps for configuring generator modules in accordance with an embodiment of the invention. At step 1602, coil groups may be determined for a generator. For example, the system controller 1340 (FIG. 13) may partition the generator coils 1302, 1304, 1306 of the stator modules 220, 222, 224, 226, 228, 230 (FIG. 2) of the generator 200 into equally sized sets based at least in part on a rotational speed of the rotor 202 (e.g., as determined at step 1506 of FIG. 15). At step 1604, power electronics modules may be assigned to coil groups. For example, the system controller 1340 may assign the power electronics modules 1318, 1320 to the coil groups determined at step 1602 based at least in part on expected generated AC waveform characteristics of the determined coil groups.

At step 1606, the generation coils 1302, 1304, 1306 (FIG. 13) may be disconnected from the power electronics modules 1318, 1320, for example, with the and/or decrease the generated power load.coil-module interconnect switches 1334, 1336, 1338. At step 1608, the coil selection switches 1310, 1312, 1314, 1316 may be signaled to create the coil groups determined at step 1602, for example, responsive to commands and/or signals generated by the system controller 1340. At step 1610, the power module selection switches 1324, 1326, 1328, 1330, 1332 may be signaled to change state in accordance with the power electronics module assignments determined at step 1604. For example, the power module selection switches 1324, 1326, 1328, 1330, 1332 may change state responsive to commands and/or signals generated by the system controller 1340. At step 1612, the generation coils 1302, 1304, 1306 may be reconnected to the power electronics modules 1318-1320 in accordance with the power electronics module assignments determined at step 1604. For example, the coil-module interconnect switches 1334, 1336, 1338 may change state responsive to commands and/or signals generated by the system controller 1340.

Figure 17:
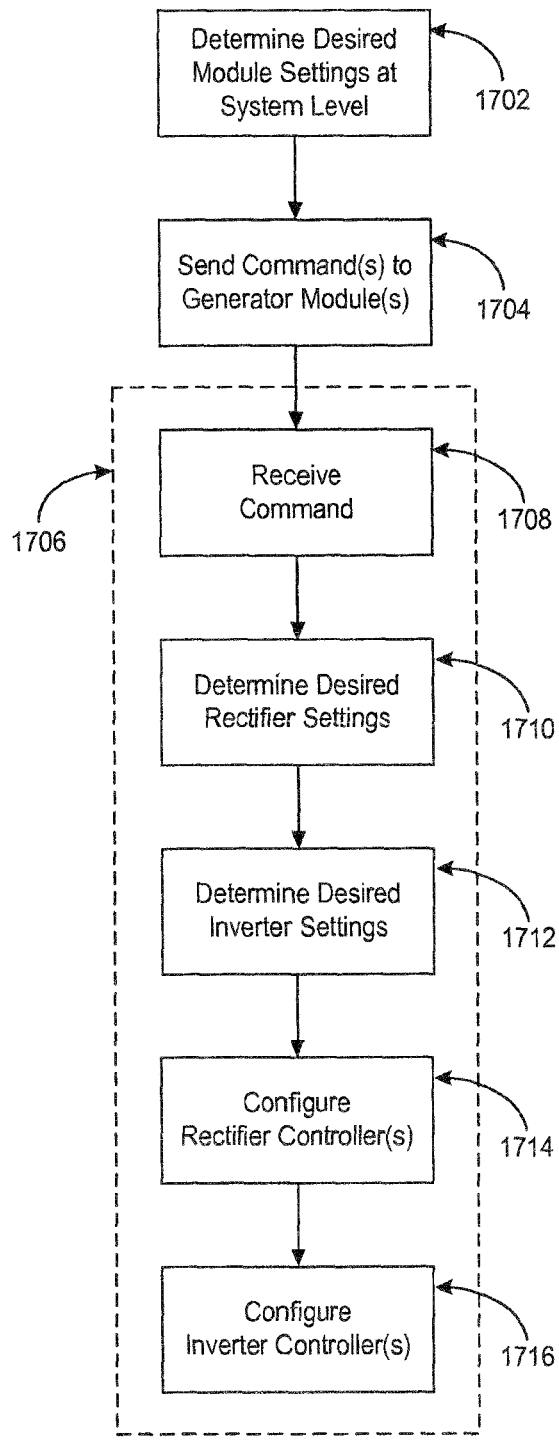
FIG. 17 is a flowchart depicting further example steps for configuring generator modules in accordance with some embodiments of the present invention.

FIG. 17 depicts further example steps for configuring generator modules in accordance with an embodiment of the invention. At step 1702, desired system level generator module settings may be determined, for example, by the system controller 1340 (FIG. 13) as described above with reference to FIG. 15 and FIG. 16. At step 1704, one or more commands may be sent to one or more generator modules. For example, the system controller 1340 may send the command(s) to configure the generator module(s) in accordance with the desired generator module settings determined at step 1702.

Dashed line 1706 indicates that steps 1708, 1710, 1712, 1714, 1716 may be performed by each of the generator module(s) to which commands were sent at step 1704. At step 1708, a command may be received. For example, the communication component 1232 (FIG. 12) of the power electronics submodule 1202 may receive the command specifying desired generator module settings sent by the system controller 1340 (FIG. 13). At step 1710, desired rectifier settings may be determined. For example, the submodule controller 1228 may determine settings for the active rectifier 1214 corresponding to the desired generator module settings specified in the command received at step 1708. At step 1712, desired inverter settings may be determined. For example, the submodule controller 1228 may determine settings for the inverter 1224 corresponding to the desired generator module settings specified in the command received at step 1708. At step 1714, one or more rectifier controllers may be configured. For example, the communication component 1232 may configure the rectifier controller 1234 in accordance with the desired rectifier settings determined at step 1710. At step 1716, one or more inverter controllers may be configured. For example, the communication component 1232 may configure the inverter controller 1236 in accordance with the desired inverter settings determined at step 1712.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

What is claimed is:

1. An electric power generation system, comprising:
    a turbine configured to rotate, a rotational speed of the turbine based at least in part on a flow rate of a fluid flow;
    a plurality of rotor modules connectively coupled with the turbine via a rotor frame, and collectively configured to generate a magnetic field having at least one characteristic based at least in part on the rotational speed of the turbine; and
    a plurality of stator modules configured to:
        generate at least one alternating electric current, in response to at least the magnetic field generated by the plurality of rotor modules;
        maintain a relative position of the plurality of rotor modules with respect to the plurality of stator modules with magnetic force; and
        control the rotational speed of the turbine;
    wherein each of the plurality of stator modules is removably coupled with a stator frame and comprises:
        at least one generating coil configured to generate the alternating electric current in response to the magnetic field generated by the rotor modules; and
        a power electronics module configured to manage the generated alternating electric current and produce a desired magnetically-induced torque that at least partially controls the rotational speed of the turbine, the power electronics module comprising:
        an active rectifier;
        an inverter; and
        a controller comprising a rectifier controller configured to control the active rectifier and an inverter controller configured to control the inverter, the controller configured to:
            receive command messages from a data bus;
            translate the received command messages into signals for the rectifier controller and signals for the inverter controller; and
            control the active rectifier and the inverter in accordance with the received command messages.

2. An electric power generation system in accordance with claim 1, wherein controlling the rotational speed of the turbine further comprises controlling at least one characteristic of said at least one alternating electric current generated by the plurality of stator modules.

3. An electric power generation system in accordance with claim 2, wherein controlling said at least one characteristic of said at least one alternating electric current comprises modifying said at least one characteristic with the active rectifier of a corresponding one of the power electronic modules.

4. An electric power generation system in accordance with claim 1, further comprising a system control module configured at least to coordinate individual stator module participation with respect to control of for controlling the rotational speed of the turbine.

5. An electric power generation system in accordance with claim 1, wherein the at least one generating coil of each of the plurality of stator modules comprises a generator coil with a plurality of tap points that are dynamically selectable with switches.

6. An electric power generation system in accordance with claim 1, wherein each of the plurality of rotor modules comprises a permanent magnet fastened to a frame of the rotor module with a flexible coupling that allows movement of the permanent magnet with respect to the frame in a direction parallel to a main magnetic flux path.

7. An electric power generation system in accordance with claim 1, wherein each rotor module comprises at least one stabilization magnet, each stator module comprises at least one corresponding stabilization magnet, and the stabilization magnets act collectively to keep stable a separation between the plurality of rotor modules and the plurality of stator modules.

\* \* \* \* \*